(12) United States Patent
Ballew

(10) Patent No.: US 12,383,892 B2
(45) Date of Patent: Aug. 12, 2025

(54) FLUID DISTRIBUTION SYSTEM

(71) Applicant: SaniSure, Inc., Camarillo, CA (US)

(72) Inventor: Chris Ballew, Thousand Oaks, CA (US)

(73) Assignee: SaniSure, Inc., Camarillo, CA (US)

( * ) Notice: Subject to any disclaimer, the term of this patent is extended or adjusted under 35 U.S.C. 154(b) by 354 days.

(21) Appl. No.: 18/321,650

(22) Filed: May 22, 2023

(65) Prior Publication Data

US 2023/0338944 A1   Oct. 26, 2023

Related U.S. Application Data

(63) Continuation-in-part of application No. 18/179,253, filed on Mar. 6, 2023, now abandoned, which is a continuation of application No. 16/994,972, filed on Aug. 17, 2020, now Pat. No. 11,596,938, which is a continuation of application No. 16/880,801, filed on May 21, 2020, now Pat. No. 10,751,713.

(51) Int. Cl.
*B01L 3/00*     (2006.01)
*B01D 24/00*    (2006.01)

(52) U.S. Cl.
CPC ............ *B01L 3/502* (2013.01); *B01D 24/005* (2013.01); *B01L 3/5082* (2013.01); *B01D 2313/105* (2013.01)

(58) Field of Classification Search
None
See application file for complete search history.

(56) References Cited

U.S. PATENT DOCUMENTS

| | | | |
|---|---|---|---|
| 553,734 A | 1/1896 | Iredale | |
| 4,467,846 A | 8/1984 | Croser | |
| 4,512,368 A | 4/1985 | Kanunaka et al. | |
| 5,381,839 A | 1/1995 | Dowd | |
| 5,839,471 A | 11/1998 | Yang | |
| 6,032,543 A | 3/2000 | Arthun et al. | |
| 6,158,484 A | 12/2000 | Greenlee | |
| 6,190,619 B1 * | 2/2001 | Kilcoin | B01J 19/0046 422/131 |

(Continued)

OTHER PUBLICATIONS

NovaSeptum, Product Specification Sheet, Crimping tool, published Nov. 2003.

*Primary Examiner* — Jennifer Wecker
(74) *Attorney, Agent, or Firm* — SoCal IP Law Group LLP; Steven C. Sereboff; Guy L. Cumberbatch

(57) ABSTRACT

There is disclosed a fluid distribution system for distributing fluid from a single source to a plurality of downstream receptacles. The system has a distribution manifold assembly with a single inlet and a plurality of outlets arrayed around a circumferential outer periphery. The outlets may be directed to the different receptacles which each have their own vent filter, or each receptacle connects back to the distribution manifold for common venting. The distribution manifold assembly may be formed by identical fluid and vent manifolds with cylindrical exteriors, or by identical fluid and vent manifolds surrounded by cylindrical frame members, to form a compact cylindrical combined assembly. Flexible conduits connect the manifold assembly to a plurality of receptacles, and a consumable subsystem of the manifold assembly, conduits and receptacle caps may be pre-assembled for ease of use.

20 Claims, 15 Drawing Sheets

(56) References Cited

U.S. PATENT DOCUMENTS

| | | |
|---|---|---|
| 6,578,802 B1 | 6/2003 | Thier |
| 6,779,575 B1 | 8/2004 | Arthun |
| 6,901,948 B2 | 6/2005 | Numberger |
| 10,006,567 B2 | 6/2018 | Zumbrum |
| 10,773,863 B2 | 9/2020 | Zumbrum |
| 2006/0272432 A1 | 12/2006 | Belongia |
| 2008/0099394 A1 | 5/2008 | Falkner et al. |
| 2011/0067738 A1* | 3/2011 | Molitor .................... B60S 3/04 134/123 |
| 2014/0076454 A1 | 3/2014 | Kjar |
| 2016/0114922 A1 | 4/2016 | Boira Bonhora et al. |
| 2020/0180938 A1 | 6/2020 | Zumbrum et al. |
| 2021/0188615 A1 | 6/2021 | Zumbrum et al. |

* cited by examiner

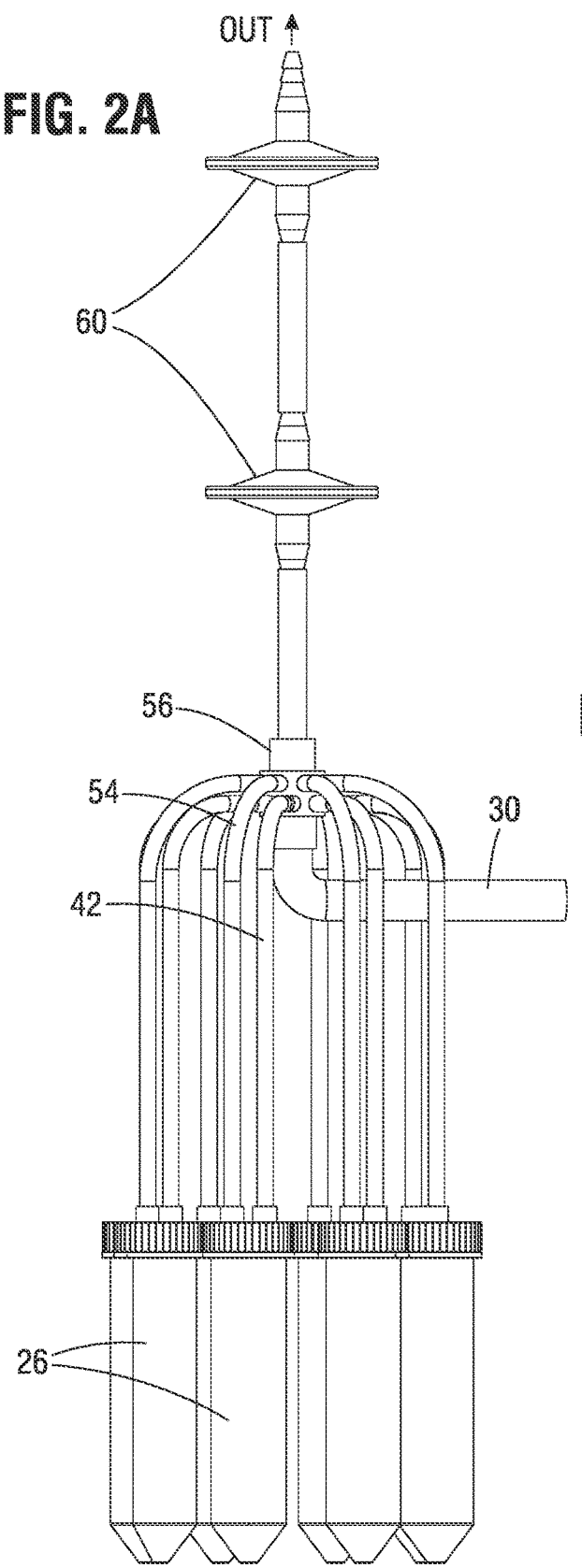
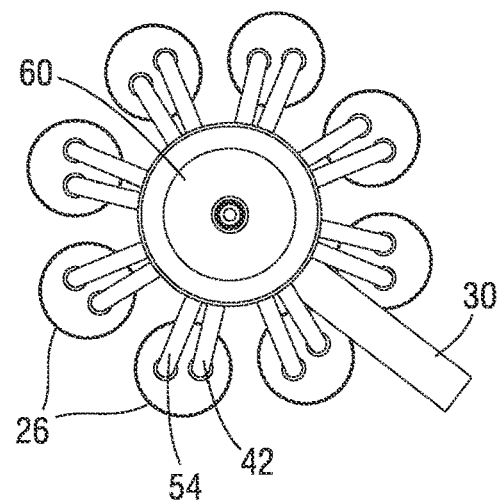
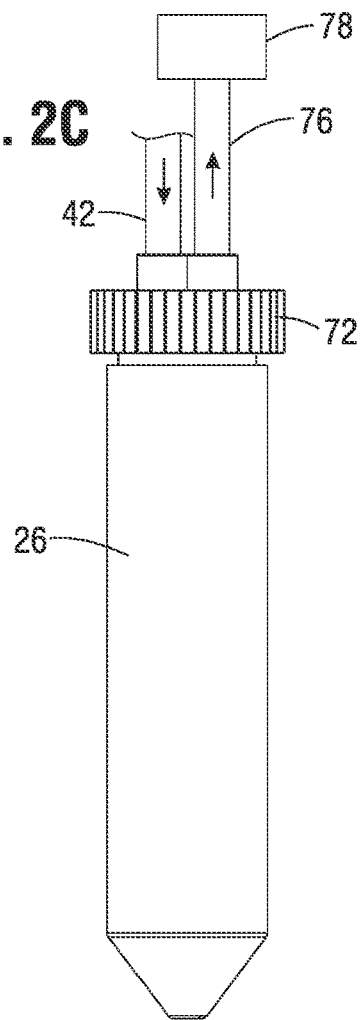
FIG. 2A
FIG. 2B
FIG. 2C

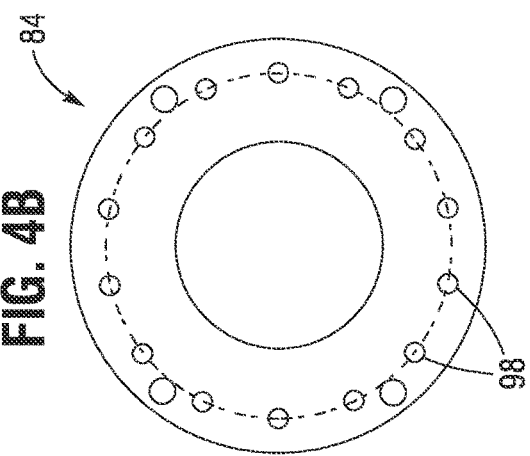
FIG. 4A
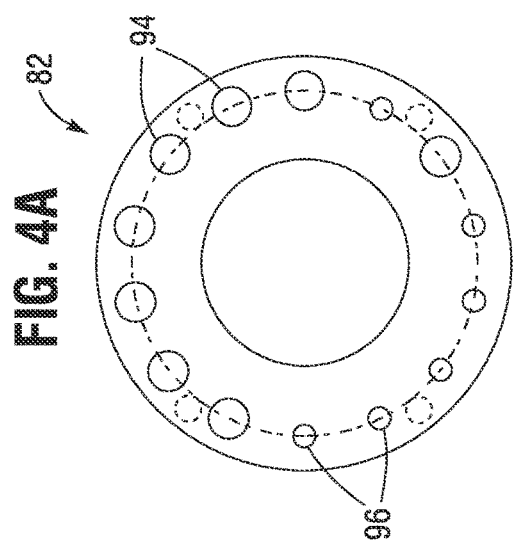
FIG. 4B
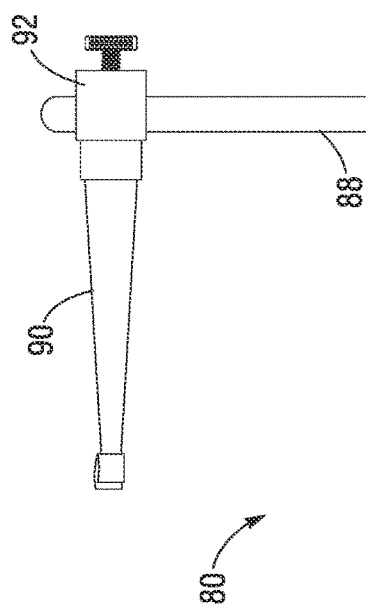
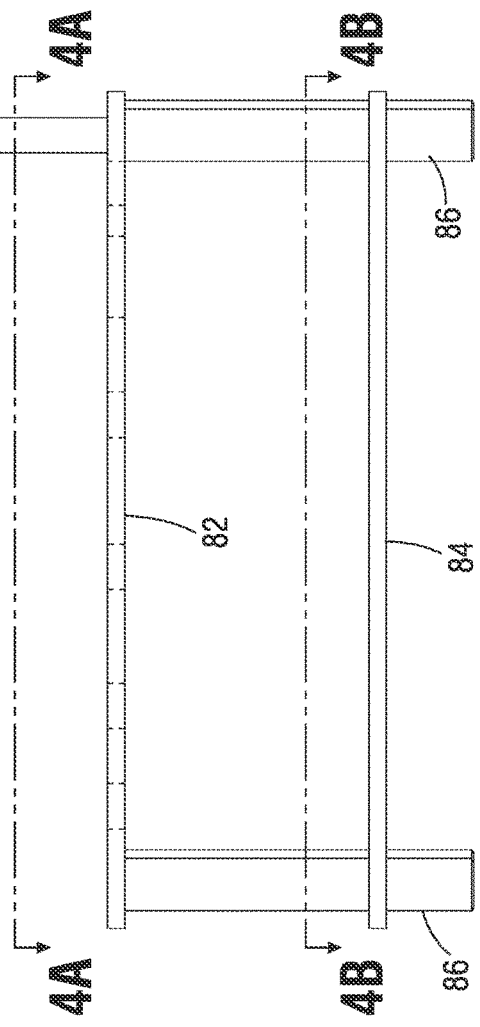
FIG. 4

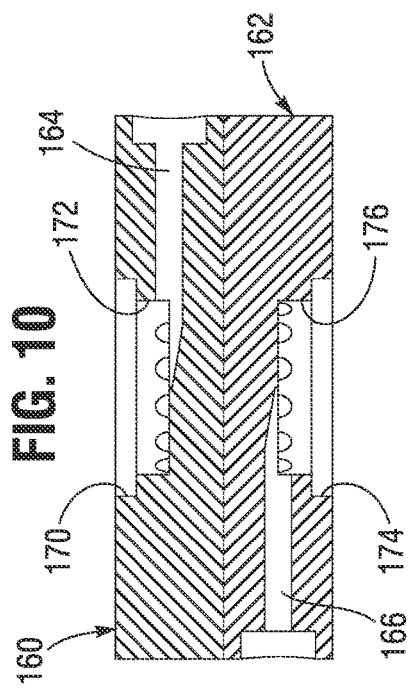
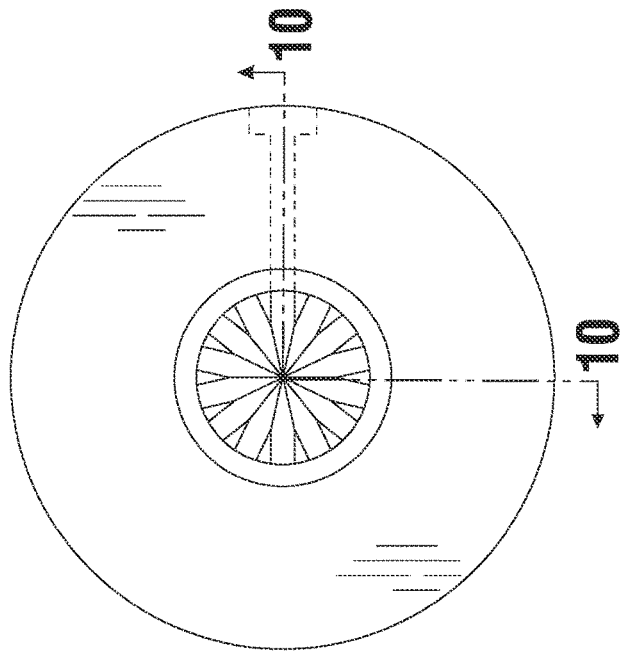
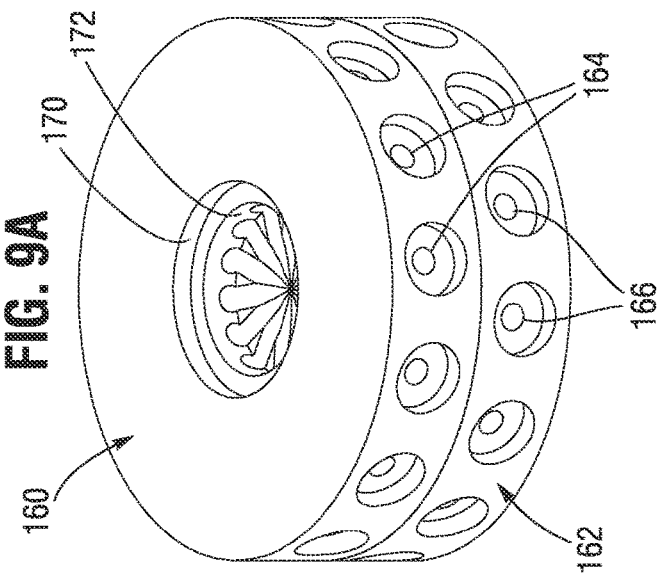
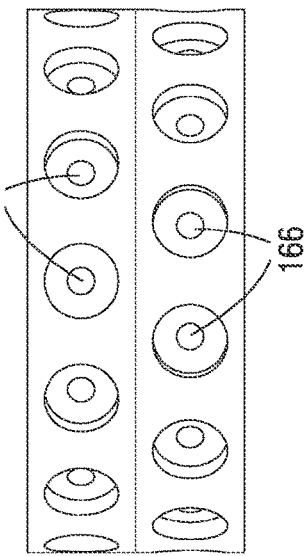

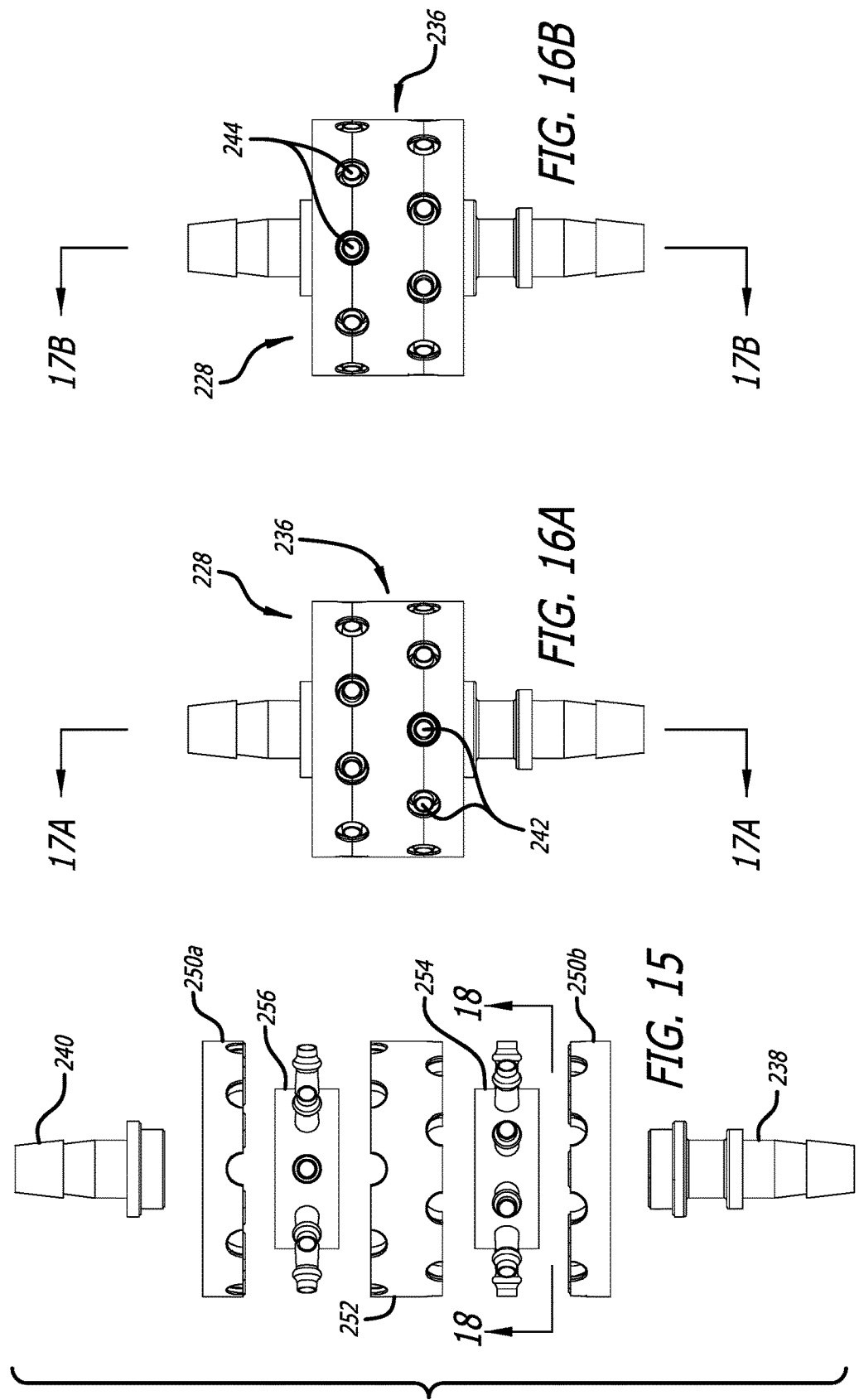

FLUID DISTRIBUTION SYSTEM

RELATED APPLICATION INFORMATION

This application is a continuation-in-part of U.S. patent application Ser. No. 18/179,253, filed Mar. 6, 2023, which is a continuation of U.S. patent application Ser. No. 16/994,972, filed Aug. 17, 2020, now U.S. Pat. No. 11,596,938, which is a continuation of U.S. patent application Ser. No. 16/880,801, filed May 21, 2020 entitled "FLUID DISTRIBUTION SYSTEM", now U.S. Pat. No. 10,751,713, all of which are hereby incorporated by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a biologically closed system for distribution of fluid and, more particularly, to a system for distributing fluid from a single source to a plurality of smaller receptacles.

Description of the Related Art

Processing of fluids in chemical and biological reactors often results in valuable fluid product which must be distributed to smaller receptacles for further processing or delivery to customers. Current systems for distribution of fluids from larger to smaller containers are inefficient.

Current systems make use of linear manifolds leading from a source of fluid to which cross and tee fittings are connected. Fluid enters from one end of the manifold and flows in a linear fashion over each cross or tee branch along the header of the manifold. When liquid flows in this manner, it takes the path of least resistance, and since most of the branches (drops) are smaller in diameter than the manifold header, they receive liquid until hydraulic pressure builds to the point of pressure equalization. This results in uneven filling and requires operator manipulation of valves to assure each container gets filled to the desired level. Manual manipulation like this can cause a mechanical failure of the joints and also create a breach in sterility. The linear design also creates a large footprint and retains large amounts of liquid (hold up volume). This is undesirable because of product value per milliliter or risk to the operator to toxic exposure.

There is a need for a system for rapid distribution of fluid from a single vessel to multiple vessels which provides greater flexibility.

SUMMARY OF THE INVENTION

The present application discloses a fluid distribution system for distributing fluid from a single source to a plurality of downstream receptacles. The system has a distribution manifold with a single inlet and a plurality of outlets arrayed around a circumferential outer periphery. The outlets may be directed to the different receptacles which each have their own vent filter, or each receptacle connects back to the distribution manifold for common venting. The system is especially useful for distributing fluid products from chemical or biological reactors while assuring an integrally closed system.

A multi-channel distribution manifold is disclosed for collecting liquid into containers simultaneously from a single source. If the container is rigid, like a bottle, venting the air that is displaced by the liquid is also needed, and thus a second manifold will be stacked underneath the liquid distribution manifold. All of the vent tubes from the bottles attach to this common hub and share a common vent filter. The distribution manifold can be used just for liquid and each bottle can have its own filter, or the community filter at the central hub may be used. The geometry of the distribution and vent manifolds along with the fusion of the tubes into the housing saves a large amount of space and distributes the fluid evenly in all directions, thus minimizing delays in fluid distribution.

DESCRIPTION OF THE DRAWINGS

FIG. 2A is a side elevational view of the fluid distribution system and FIG. 2B is a top plan view thereof;

FIG. 2C illustrates an alternative configuration of receptacle for use with the fluid distribution system that has a discrete vent filter;

FIG. 4 is a side elevational view of the support stand, and FIGS. 4A and 4B are top plan views of two receptacle support rings thereof;

FIGS. 9A-9C are perspective, plan, and elevational views of an alternative combined fluid distribution manifold and vent manifold having the capacity for filling and venting fourteen different connected receptacles;

FIG. 10 is a sectional view taken along the angled line 10-10 in FIG. 9B;

FIG. 15 is an exploded elevational view of the fluid distribution and vent manifold assembly;

FIGS. 16A and 16B are elevational views of the fluid distribution and vent manifold assembly in slightly different rotational positions;

DETAILED DESCRIPTION

Referring now to FIGS. 1-4, an exemplary fluid distribution system 20 is illustrated for distributing fluid from a single source to eight individual receptacles. It should be understood that the illustrated system 20 is just one example, and the concepts disclosed herein can be modified for different systems.

Figure 1:
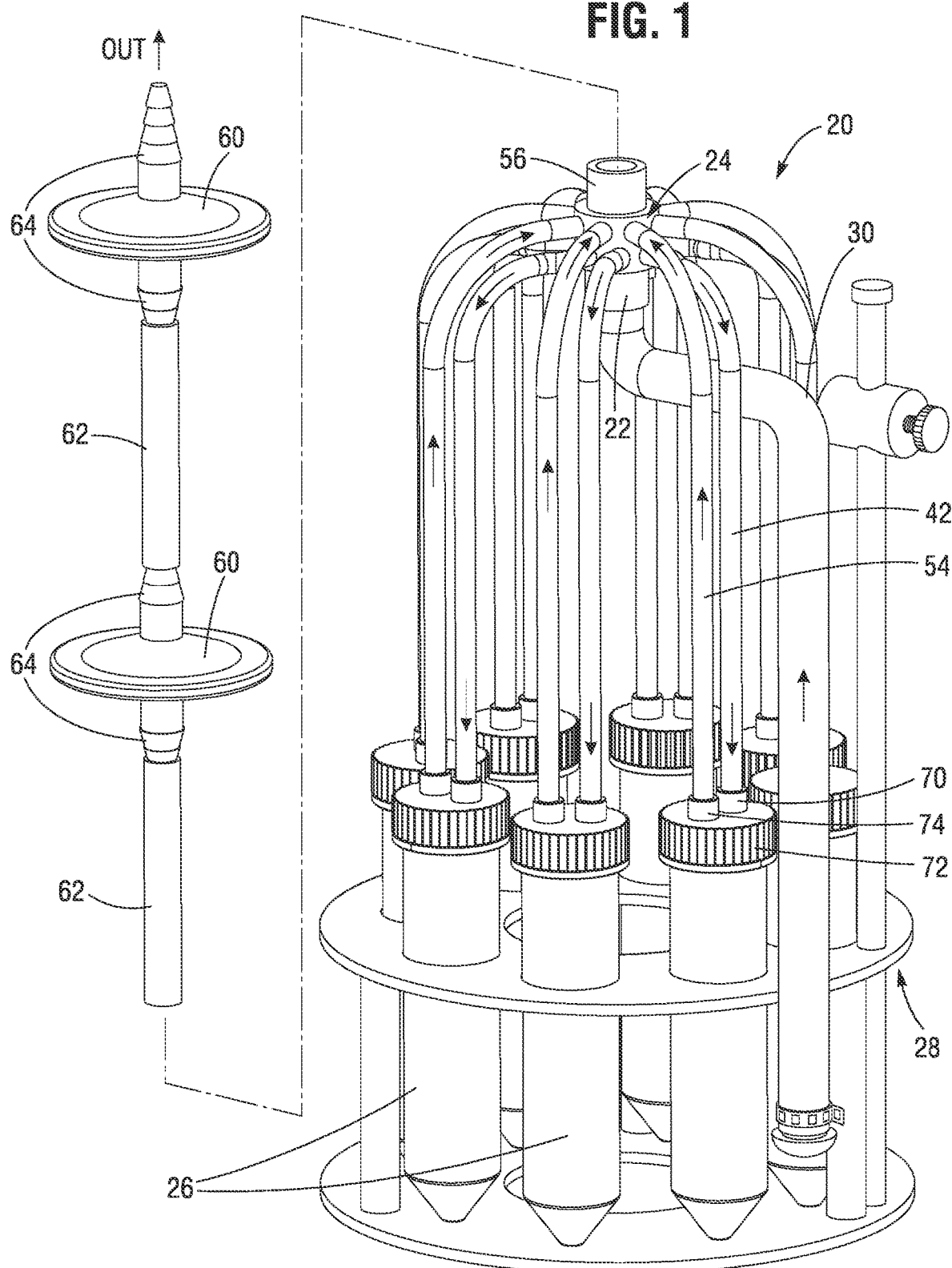
FIG. 1 is a perspective view of an exemplary fluid distribution system for quickly filling eight smaller receptacles from a single source, all supported by a support stand.

In FIGS. 1 and 2A-2B, the exemplary fluid distribution system 20 shows a lower inlet 22 leading to a distribution manifold 24 that separates an inlet fluid flow for delivery to eight individual receptacles 26, all supported by a support stand 28. Although not shown, a source for the inlet flow may comprise a larger vessel, such as a bioreactor vessel or other such chemical processing equipment. The fluid distribution system 20 is especially useful for dividing fluid flow from such a larger vessel into smaller individual receptacles 26, such as the flasks shown. The lower inlet 22 of the distribution manifold 24 located on its underside connects to a larger inlet pipe 30.

Figure 3A:
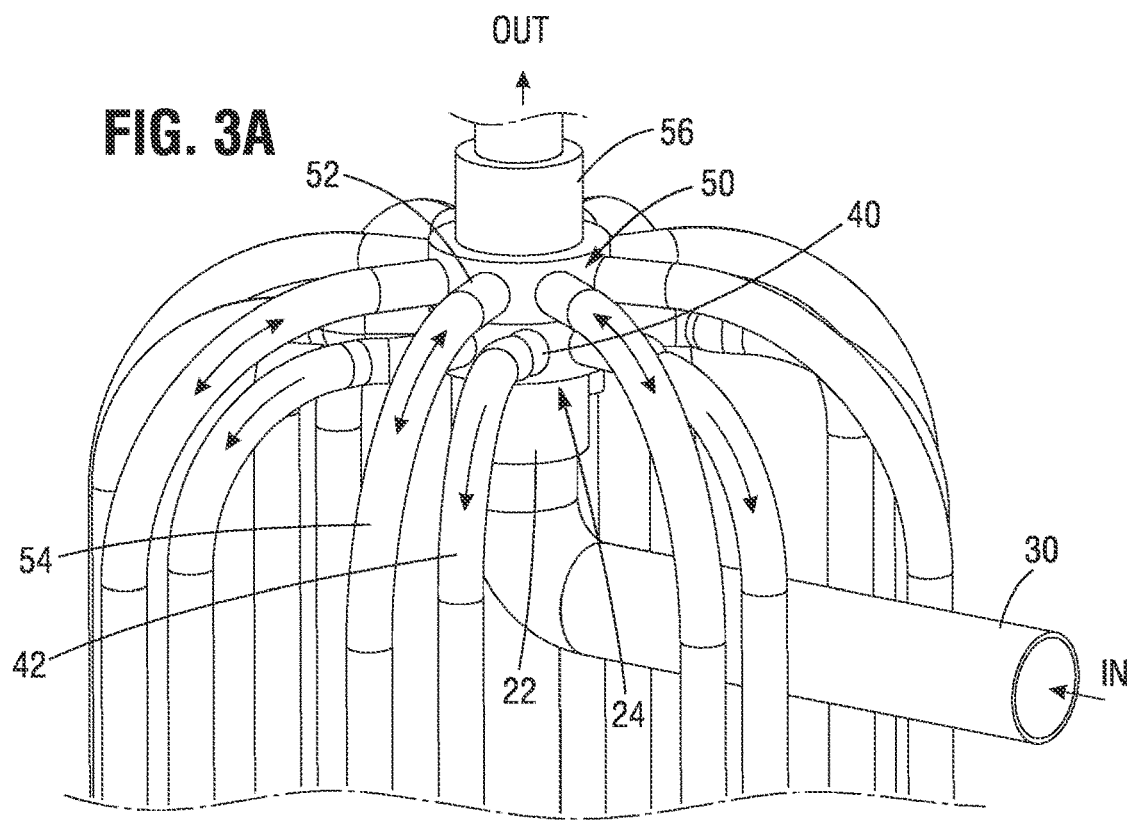
FIGS. 3A and 3B are enlarged perspective and elevational views of a combined fluid distribution and vent manifold for the fluid distribution system with inlet and outlet conduits coupled thereto.
Figure 3B:
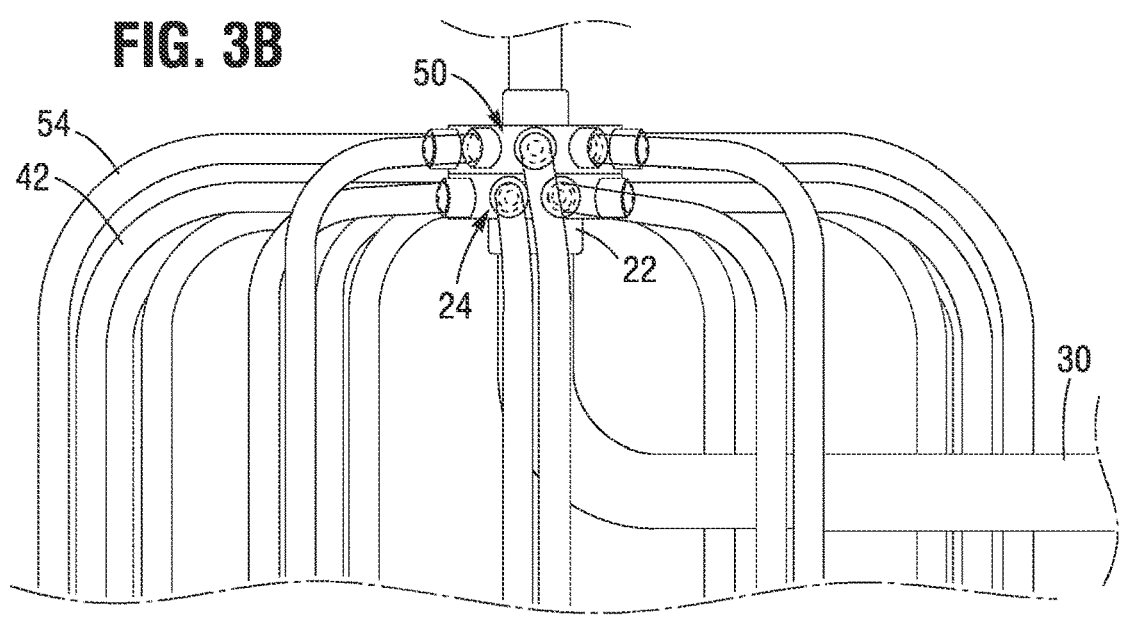

Fluid distribution manifold 24 is seen in the enlarged perspective and elevational views of FIGS. 3A and 3B, and comprises a compact cylindrical body having a plurality of ports or outlets 40 leading to outlet fluid tubes or conduits 42. The conduits 42 may be fused or otherwise bonded into the outlets 40 which are recessed, as described below. As mentioned, there are eight outlets 40 and outlet conduits 42 distributed evenly (45° increments) around the circumference of the cylindrical manifold 24. As will be explained below, internal channels within the manifold 24 direct fluid flowing in through the inlet 22 evenly outward through the outlets 40 and outlet fluid conduits 42.

FIGS. 3A and 3B illustrate a common vent manifold 50 positioned directly above the fluid distribution manifold 24. The vent manifold 50 is similarly shaped with a compact cylindrical body and has a plurality of ports or inlets 52 which receive inlet vent tubes or conduits 54. The conduits 54 may be fused or otherwise bonded into the inlets 52 which are recessed, as described below. The vent manifold 50 has a central outlet 56 located on its upper middle. As will be shown, the vent manifold 50 provides a plurality of internal channels which connect the inlets 52 to the central outlet 56. The central outlet 56 may be directed to be vented into the atmosphere, or may be connected to a common vent filter that filters all of the air displaced from various receptacles 26 during filling.

For instance, as seen in FIG. 1, the gas vented through the central outlet 56 may be filtered through one or more filters 60 connected in line via a plurality of short sections of tubing 62. In the illustrated embodiment, the filters 60 comprise disk-shaped hydrophobic vent filters having inlet and outlet tubing nipples 64 along their central axes. The filters 60 help prevent egress of toxic fluids that may be carried in vaporized form in the vent gasses.

The conduits 40, 54 are desirably tubes made of thermoplastic elastomer (TPE) which be connected in various ways to the manifold ports 40, 52. For instance, the conduits 40, 54 may be attached using hose barb connections with band clamps, tri-clamp flange connections or interference connections with adhesive. For a closed system 20 that is sold ready to be used by a customer, the conduits 40, 54 are molded or affixed within the manifold ports 40, 52 and pre-connected in a sealed manner to the receptacles 26. Plugs (not numbered) close the end of the inlet pipe 30 and the end of the last sections of outlet tubing 62. The interior of the system 20 is thus sealed off, aside from the breathable vents 60 which have sufficient filter size to prevent any contamination.

With reference back to FIGS. 1 and 2A-2B, fluid flows in through the inlet pipe 30 to the lower center inlet 22 of the distribution manifold 24. From there, the fluid is evenly distributed outward through the eight outlets 40 and outlet conduits 42. Each of the outlet conduits 42 extends (in this case vertically downward) to a connector 70 in a lid 72 of one of the receptacles 26. As fluid fills each receptacle 26, air or other gas therewithin is displaced upward through a second connector 74 in the lid 72, and upward through the vent conduits 54. The displaced air or gas from each of the conduits 54 is ported inward through the eight inlets 52 (FIG. 3A), and from there to the central outlet 56 and filters 60 along the tubing sections 62. In this way, the combination of the distribution manifold 24 and vent manifold 50 permits filling and venting of the eight receptacles 26 through a single, common location.

FIG. 3A indicates both directions of gas flow for the vent conduits 54. Although not usual, a pressure differential down the conduits 54 may be generated to fill sampling dip tubes (not shown) connected to one or more receptacles 26. Normally the gas flow is upward, though.

It should be understood that each of the receptacles 26 may alternatively have its own separate filter, rather than each receptacle porting vent gas to a common filter location. For instance, FIG. 2C illustrates an alternative configuration where one or more of the receptacles 26 receives fluid through the fluid conduit 42, and vents gas through a short vent conduit 76 leading to a discrete filter 78. Alternatively, the discrete filter 78 may be incorporated into the lid 72 of the receptacle 26. Whichever way the alternative is configured, the receptacle 26 has an individual or discrete gas filter. If all of the receptacles 26 have their own filters 78, the entire vent manifold 50 may be eliminated. The filter 78 is shown in generic form to indicate that it may be a number of different types, including the hydrophobic vent filter 60 described above as well as a simple porous membrane, as the particular process dictates.

Figure 5:
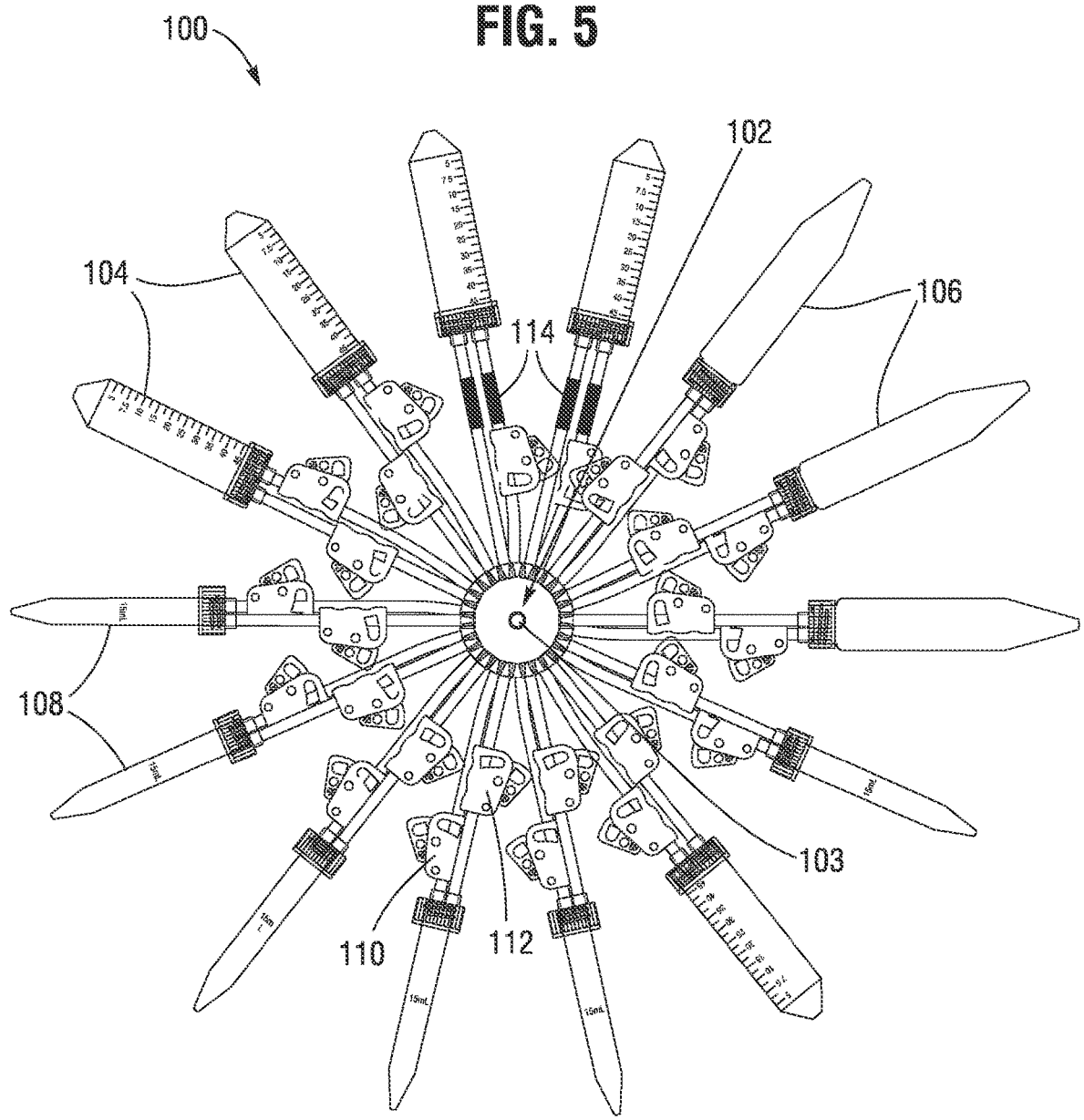
FIG. 5 is a schematic illustration of connections between an exemplary combined fluid distribution and vent manifold and a number of diverse connected receptacles that receive fluid through the manifold from a single source.

FIG. 4 is a side elevational view of a support stand 80 much like the support stand 28 shown above, yet adapted for a diverse set of receptacles, such as one seen in FIG. 5. FIGS. 4A and 4B are top plan views of two receptacle support rings 82, 84 for the support stand 80.

Upper and lower support rings 82, 84 are supported in space parallel relationship by a plurality of vertical legs 86, typically held within aligned through holes (not numbered) in each support ring. An upright post 88 extends upward from the upper support ring 82, and a horizontal arm 90 is secured thereon at variable heights by an adjustable clamp 92. In the embodiment of FIGS. 1-4, the upright post supports the inlet pipe 30, though the horizontal arm 90 can be used to directly support the fluid distribution and vent manifolds.

The upper support ring 82 has a plurality of apertures formed therein that may be arranged around a common concentric circle and are sized to receive a number of the fluid receptacles. In this embodiment, the support ring 82 has large apertures 94 and small apertures 96 sized to closely receive receptacles of different diameters. The lower support ring 84 also includes a plurality of apertures 98 that receive and brace from movement lower ends of the receptacles. For example, FIG. 1 illustrates a number of receptacles 26 having conical bottom ends, wherein the apertures 98 are sized to receive the lower apex of the bottom ends. Similarly, rounded bottom ends on receptacles may be received in the apertures 98. In general, the two support rings 82, 84 provide firm vertical bracing for various forms of receptacles.

FIG. 5 is a schematic illustration of a fluid distribution system 100 showing connections between a combined fluid distribution and vent manifold 102 and a number of diverse connected receptacles. The distribution manifold 102 has an upper vent outlet 103, in this case represented by a through bore of the filter as described above. In this embodiment, the distribution manifold 102 has fourteen outlets (not shown) in fluid communication therewith. As such, there are fourteen outlet conduits (not numbered) extending away from the distribution manifold 102 to fourteen receptacles. A common vent manifold is provided in the distribution manifold 102 and connected to vent conduits (not numbered) returning from the receptacles. Each of the fluid outlet conduits may have a flow control valve 110 positioned thereon for opening and closing flow to that particular receptacle. Likewise, each vent conduit may have a flow control valve 112 positioned thereon to close off that particular receptacle from any back venting from the vent manifold that may be openly connected to the other receptacles. The flow control valves 110, 112 may be simple clamps such as used in medical tubing.

Both the fluid conduits and vent conduits for two of the larger receptacles 104 may have sleeve-like crimping tubes 114 thereon. The crimping tubes 114 enable the conduits to be crimped and thus closed off after filling the respective receptacle. The crimping tubes 114 may be formed of brass, and may be configured to be separated after crimping so as to easily detach the filled receptacle from the overall system. For example, a crimping and separating device such as described in U.S. Pat. No. 6,779,575 to Arthun may be utilized. Further, the conduits may be formed of heat sealable TPE which can be sealed with heat and simply cut off to preserve a filled receptacle for later use.

There are five large receptacles 104 having volumetric indicators thereon. Additionally, there are three medium-size receptacles 106, and six smaller receptacles 108. This combination of receptacles is just one of many that can be connected to the manifold 102, and any number of variations are contemplated. The flow into the receptacles 104, 106, 108 from the common distribution manifold 102 and venting of gas out of the receptacles to a common vent manifold and filter has been described previously and thus will not be repeated. One or more of the fluid conduits may be closed off or plugged if less than the total number will be filled at any one time.

Figure 6A:
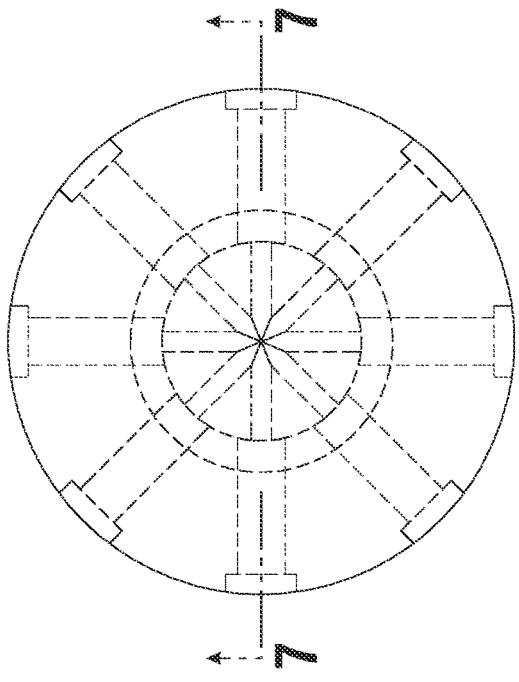
FIGS. 6A-6C are perspective, plan, and elevational views of a fluid distribution manifold having the capacity for distributing fluid evenly to eight different connected receptacles.
Figure 6C:
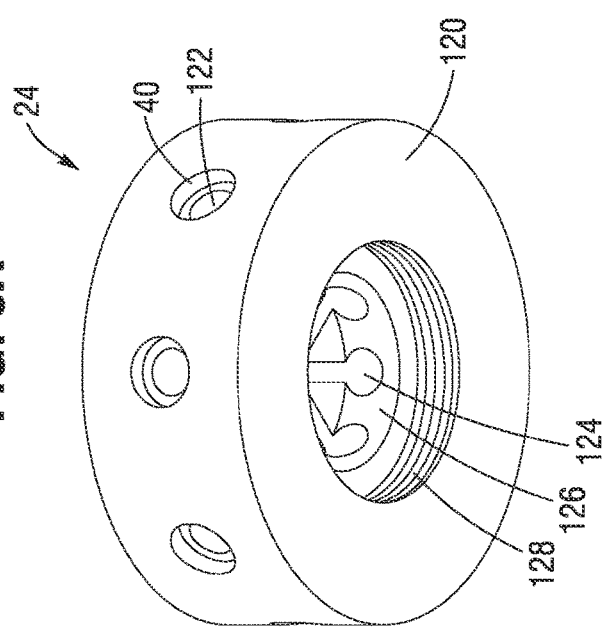
Figure 6B:
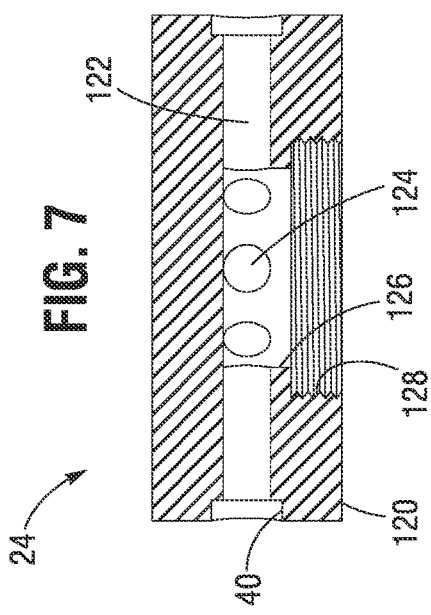

FIGS. 6A-6C are perspective, plan, and elevational views of an exemplary cylindrical fluid distribution manifold 24 having the capacity for evenly filling eight different connected receptacles, such as was described above. This particular distribution manifold 24 may be identical to the vent manifold 50 in the system shown in FIGS. 1-4, and as such the following description applies to both.

The distribution manifold 24 has a solid body 120 that may be molded out of a suitable polymer such as polypropylene. The body 120 has a squat cylindrical configuration with a plurality of the outlets or ports 40 formed therein and distributed evenly around its circumferential outer wall. Preferably, the ports 40 are formed by a recessed step leading to a radial through bore 122. As mentioned, the conduits 42 are easily fused or bonded into the recessed ports 40 for a particular system 20.

Figure 7:
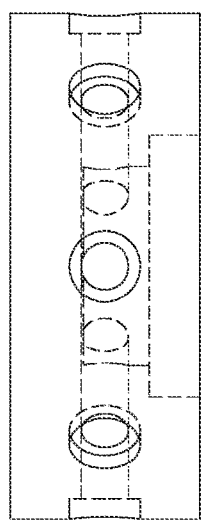
FIG. 7 is a sectional view taken along the line 7-7 in FIG. 6B.

Inner apertures 124 of some of the through bores 122 are shown in FIGS. 6A and 7, opening through an inner cylindrical wall 126. The inner cylindrical wall 126 defines a common inner plenum chamber within the distribution manifold 24. The inner wall 126 has an axial height large enough for the inner apertures 124, and then steps radially outward to a second inner cylindrical wall 128 that intersects the lower surface of the body 120. A flat upper surface of the body is closed so that the larger inner wall 128 forms a common opening in communication with each of the outlets 40. The larger inner wall 128 provides a cylindrical recess which either forms the central inlet 22 or provides a convenient recess in which to bond a coupler which connects to the larger inlet pipe 30, as described above. The inlet pipe 30 or inlet coupling 22 is preferably fixed by thermal fusion, thermal welding or bonding within the inner wall 128, or the inner wall 128 may be threaded as shown so as to removably receive an inlet coupling 22 or the inlet pipe 30 directly.

The inner apertures 124 are evenly spaced around the inner plenum chamber and the through bores 122 are identically sized and evenly arrayed in a spoke-like fashion to ensure even pressure distribution of the fluid. This enables even filling of the multiple receptacles 26. There are eight connected receptacles 26, though more may be accommodated in the same manner. The solid body 120 of the distribution manifold 24 is desirably cylindrical with the through bores 122 being radially oriented. However, the shape may be other than cylindrical as long as the through bores 122 are evenly distributed to create an even filling pressure. For instance, the solid body 120 may be spherical, hemispherical, square, hexagonal or otherwise a regular polygon, etc.

In the same manner, the vent manifold 50 will be inverted relative to the fluid distribution manifold 24 in FIG. 6A, so that the larger inner cylindrical wall opens upward and forms the outlet 56. The closed upper surface of the fluid distribution manifold 24 is desirably flat, as is the closed lower surface of the vent manifold 50 such that the two manifolds can be positioned in abutting relationship, as indicated in FIGS. 3A and 3B. The two manifolds 24, 50 may be secured together with fusion or adhesive bonding.

FIGS. 8A-8D are perspective, plan, and elevational views of a combined vent manifold 140 and fluid distribution manifold 142 having the capacity for filling and venting 10 different connected receptacles. The physical configuration of the two manifolds 140, 142 is much the same as was described above with respect to the vent manifold 50, wherein both are formed of molded polymer bodies having a squat cylindrical shape, a common inlet or outlet along the central axis and radial passages 144, 146 through the outer circumferential walls. It should be noted that although the vent manifold 140 is positioned below the fluid distribution manifold 142, the positions could easily be reversed with minimal adjustment to the connecting conduits. The same applies to all other embodiments disclosed herein.

A first inner chamber 150 is formed by an inner cylindrical wall centrally located through an upper surface of the vent manifold 140. The radial passages 144 extend inward and open into an inner plenum chamber 152 also formed by an internal cylindrical wall. The first inner chamber 150 is larger than the inner plenum chamber 152 and defines a receptacle or port within which an outlet connector such as shown at 56 in FIG. 1 can be affixed. Although not shown, the same configuration of stepped inner chambers is provided at the bottom of the fluid distribution manifold 142.

If both the vent manifold 140 and fluid distribution manifold 142 are used, they may be separately molded or machined and then connected together through bonding, such as adhesive. There are 10 radial passages 144, 146 in each of the manifolds 140, 142, respectively, angularly spaced apart by an angle θ of 36°. As seen in FIGS. 8A-8D, the radial passages 144 are angularly offset by half that amount, or 18°, with respect to the radial passages 146. This helps provide space for the fluid and vent conduits that are connected around the conjoined manifolds 140, 142.

Figure 8A:
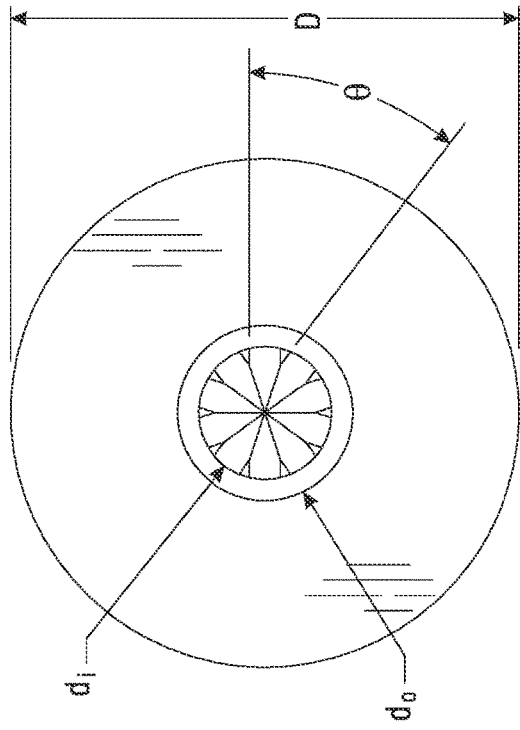
FIGS. 8A-8D are perspective, plan, and elevational views of combined fluid distribution manifold and vent manifolds having the capacity for filling and venting 10 different connected receptacles.
Figure 8B:
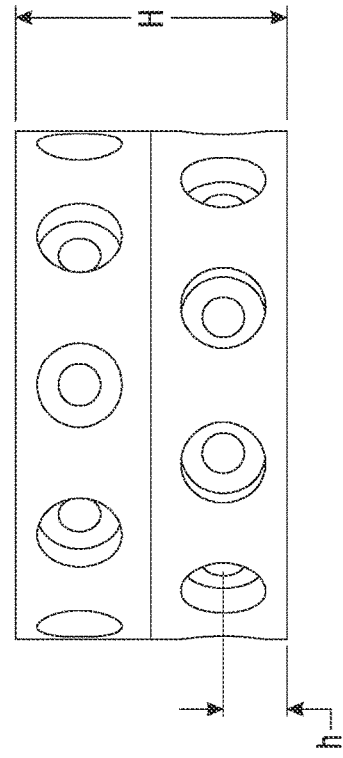
Figure 8C:
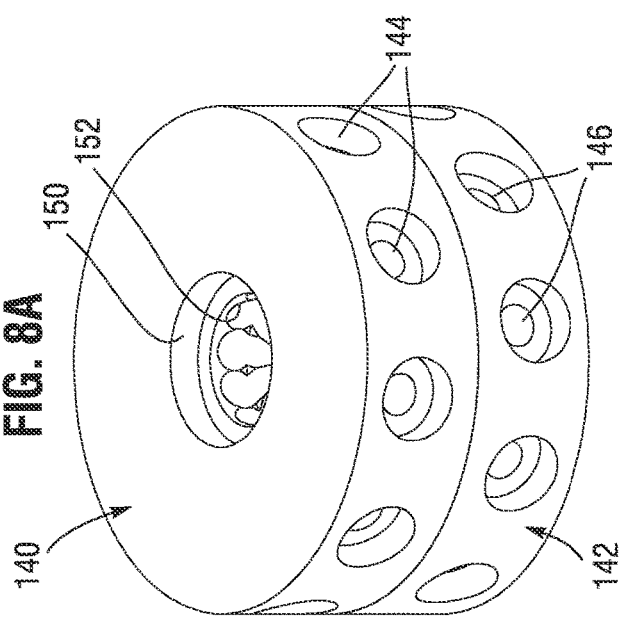
Figure 8D:
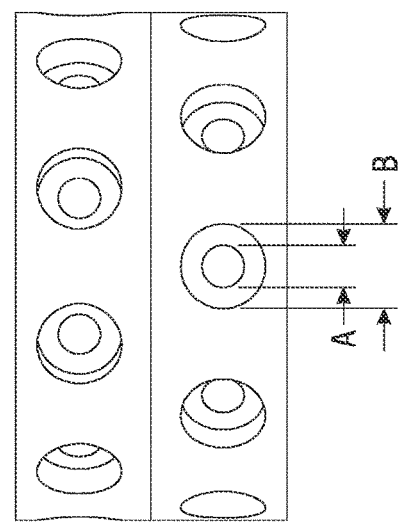

FIGS. 8B-8D illustrate a number of key dimensional parameters for the manifolds 140, 142. In this embodiment, the two manifolds 140, 142 are identical and thus the dimensions that apply to one also apply to the other.

Each manifold 140, 142 defines an exterior diameter D, an inner diameter $d_i$ for the inner plenum chamber 152, and an outer diameter do for the larger inner chamber. The total exterior height H of the combined manifolds 140, 142 is shown, which may be twice the height of each of the manifolds separately. The height h from the adjacent lower or upper face of the respective manifold at which each of the radial passages 144, 146 are positioned is desirably one half of the height of that particular manifold. Each radial passage 144, 146 is angularly spaced an angle θ from the adjacent passage. An inner luminal diameter A of each radial passage 144, 146 is shown, as well as a diameter B of an outlet port. Exemplary values for each of these dimensional parameters is provided below in a table for the three manifolds shown. Dimensions for manifolds configured with a different number of radial passages or intended for use with particular fluids may be modified but fall within the general pattern disclosed.

FIGS. 9A-9C illustrate a still further stacked vent manifold 160 and fluid distribution manifold 162 having the capacity for filling and venting fourteen different connected receptacles, and FIG. 10 is a sectional view taken along the angled line 10-10 in FIG. 9B. As before, the two manifolds 160, 162 are both desirably formed of molded polymer bodies having a squat cylindrical shape, with a common inlet or outlet along the central axis and radial passages 164, 166 through the outer circumferential walls.

A first inner chamber 170 is formed by an inner cylindrical wall centrally located through an upper surface of the vent manifold 160. The radial passages 164 extend inward and open into an inner plenum chamber 172 also formed by an internal cylindrical wall. The first inner chamber 170 is larger than the inner plenum chamber 172 and defines a receptacle or port within which an outlet connector such as shown in 56 in FIG. 1 can be affixed. FIG. 10 is a cross-section which illustrates the same stepped inner chambers 174, 176 formed in the lower face of the fluid distribution manifold 162. Once again, the first inner chamber 174 provides a receptacle or port within which a common conduit such as the inlet pipe 30 shown above may be fastened. The smaller inner plenum chamber 176 opens outward to the radial passages 166.

If both the vent manifold 160 and fluid distribution manifold 162 are used, they may be separately molded or machined and then connected together through bonding, such as adhesive. There are 14 radial passages 164, 166 in each of the manifold 160, 162, respectively, angularly spaced apart an even amount, in this case about an angle θ of 25.7°. As seen in FIG. 9C, the radial passages 164 are angularly offset by half that amount with respect to the radial passages 166. This helps provide space for the fluid and vent conduits that are connected around the conjoined manifolds 160, 162.

The manifolds may have four or more inlets/outlets up to a practical maximum of 32. Of course, the size of the manifolds may have to be altered for greater number of connections. An even number makes fabrication easier, though the concept is not so limited.

TABLE I

Exemplary Dimensions for Disk-Shaped Fluid Distribution Manifolds (in.)

| No. of Radial Outlets | 8 | 10 | 14 |
|---|---|---|---|
| Overall dia. D | 1.000 | 1.500 | 2.500 |
| Inner dia. $D_i$ | 0.394 | 0.394 | 0.800 |
| Outer diameter $D_o$ | 0.518 | 0.518 | 1.000 |
| Overall Height H | 0.750 | 0.800 | 1.000 |
| Height h | 0.188 | 0.188 | 0.250 |
| Orifice dia. A | 0.094 | 0.125 | 0.110 |
| Port dia. B | 0.140 | 0.250 | 0.300 |

For each of the above exemplary dimension, tolerances of ±0.005 apply.

Figure 11:
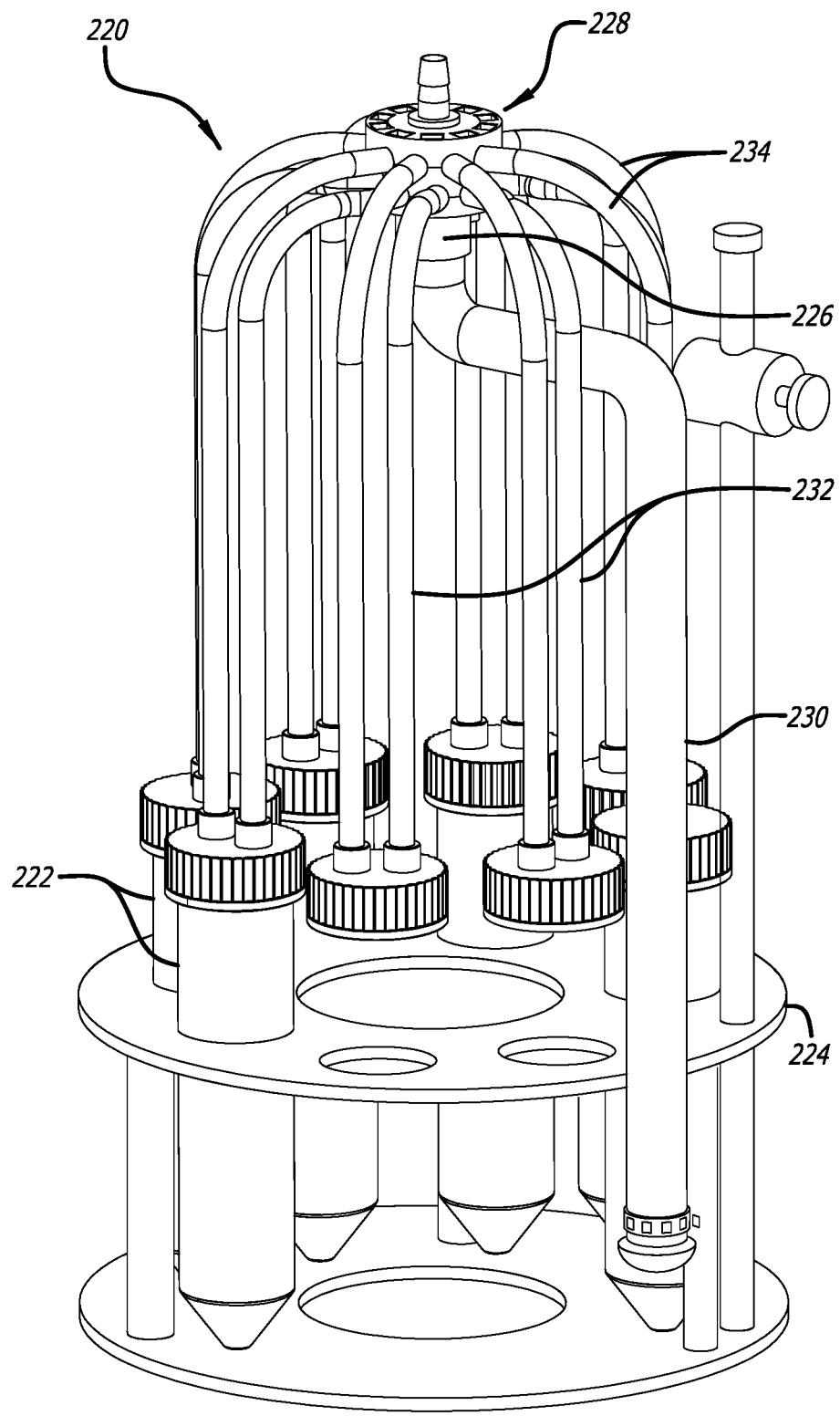
FIG. 11 is a perspective view of an alternative fluid distribution system for quickly filling eight smaller receptacles from a single source, all supported by a support stand.

FIG. 11 is a perspective view of an alternative fluid distribution system 220 for quickly filling eight receptacles 222 from a single source, all supported by a support stand 224. The alternative fluid distribution system 220 includes a lower inlet 226 leading to a fluid distribution and vent manifold assembly 228 that separates an inlet fluid flow for delivery to eight individual receptacles 222, all supported by the support stand 224. Although not shown, a source for the inlet flow may comprise a larger vessel, such as a bioreactor vessel or other such chemical processing equipment. The fluid distribution system 220 is especially useful for dividing fluid flow from such a larger vessel into smaller individual receptacles 222, such as the flasks shown. The lower inlet 226 of the manifold assembly 228 located on its underside connects to a larger inlet pipe 230.

Figure 12:
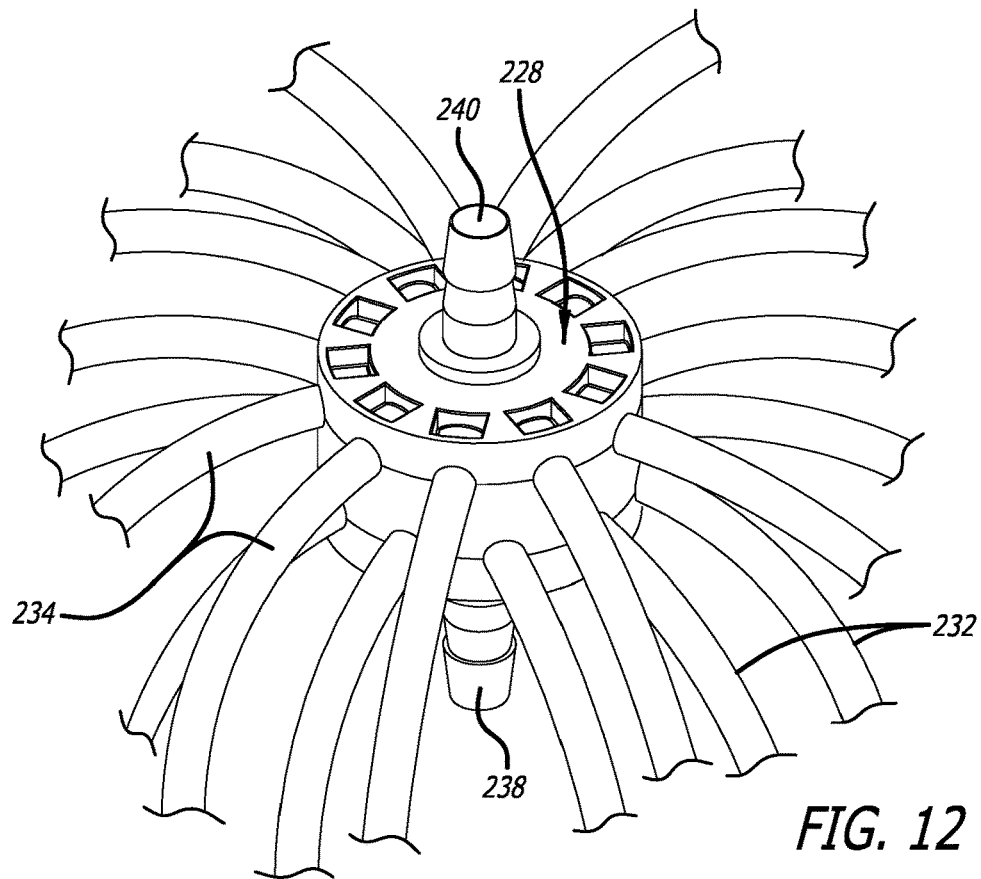
FIG. 12 is an enlarged perspective view of the alternative fluid distribution and vent manifold assembly for the fluid distribution system with inlet and outlet conduits coupled thereto.
Figure 13:
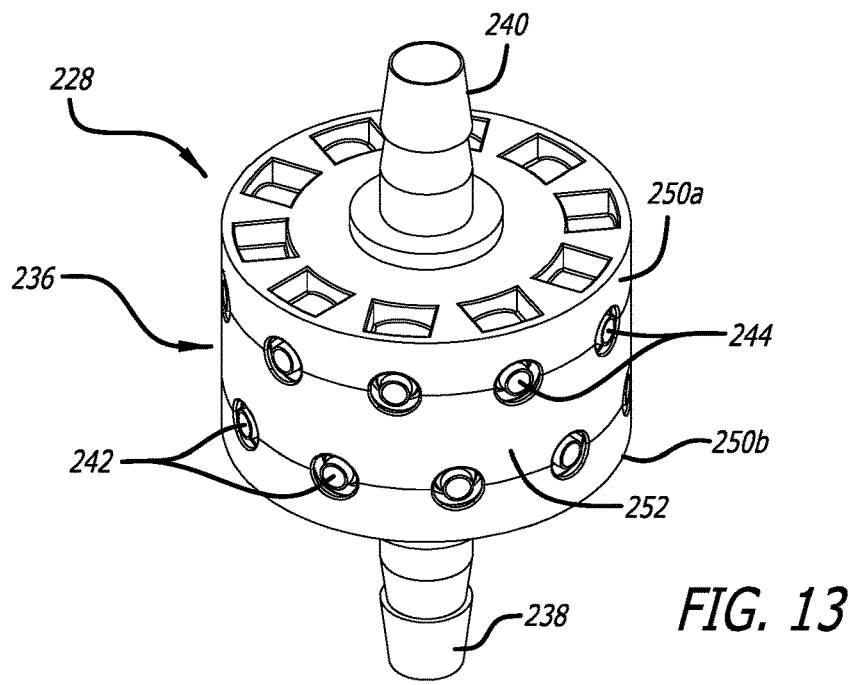
FIG. 13 shows the fluid distribution and vent manifold assembly with the inlet and outlet conduits removed.

Fluid distribution and vent manifold assembly 228 is seen in the enlarged perspective and elevational views of FIGS. 12 and 13. Namely, FIG. 12 is an enlarged perspective view of the manifold assembly 228 with fluid outlet and inlet tubes or conduits 232, 234 coupled thereto, and FIG. 13 shows the manifold assembly with the conduits removed. The manifold assembly 228 comprises a compact cylindrical frame 236 and a central inlet connector 238 projects below the cylindrical frame 236 and central outlet connector 240 projects upward. The manifold assembly 228 includes a plurality of lower outlet ports 242 that couple to the outlet conduits 232, and a plurality of upper inlet ports 244 are coupled to the inlet conduits 234. The fluid conduits 232, 234 may be fused, bonded or otherwise fixed to the outlet ports 242 and inlet ports 244 which are recessed within the cylindrical manifold assembly 228, as described below.

As illustrated, there are ten outlet ports 242 and outlet conduits 232 distributed evenly (36° increments) around the circumference of the cylindrical manifold assembly 228. Likewise, there are shown ten inlet ports 244 and inlet conduits 234 distributed evenly (36° increments) around the circumference of the cylindrical manifold assembly 228. Of course, there may be more or less inlet and outlet ports 242, 244 as desired. As will be explained below, primary internal channels within the manifold assembly 228 direct fluid flowing in through the inlet connector 238 evenly outward through the outlet ports 242 and fluid outlet conduits 232. When configured to provide a common vent, secondary internal channels within the manifold assembly 228 direct fluid flowing in through the inlet conduits 234 and inlet ports 244 evenly inward to a central plenum and central outlet connector 240 to be vented upward.

Figure 14:
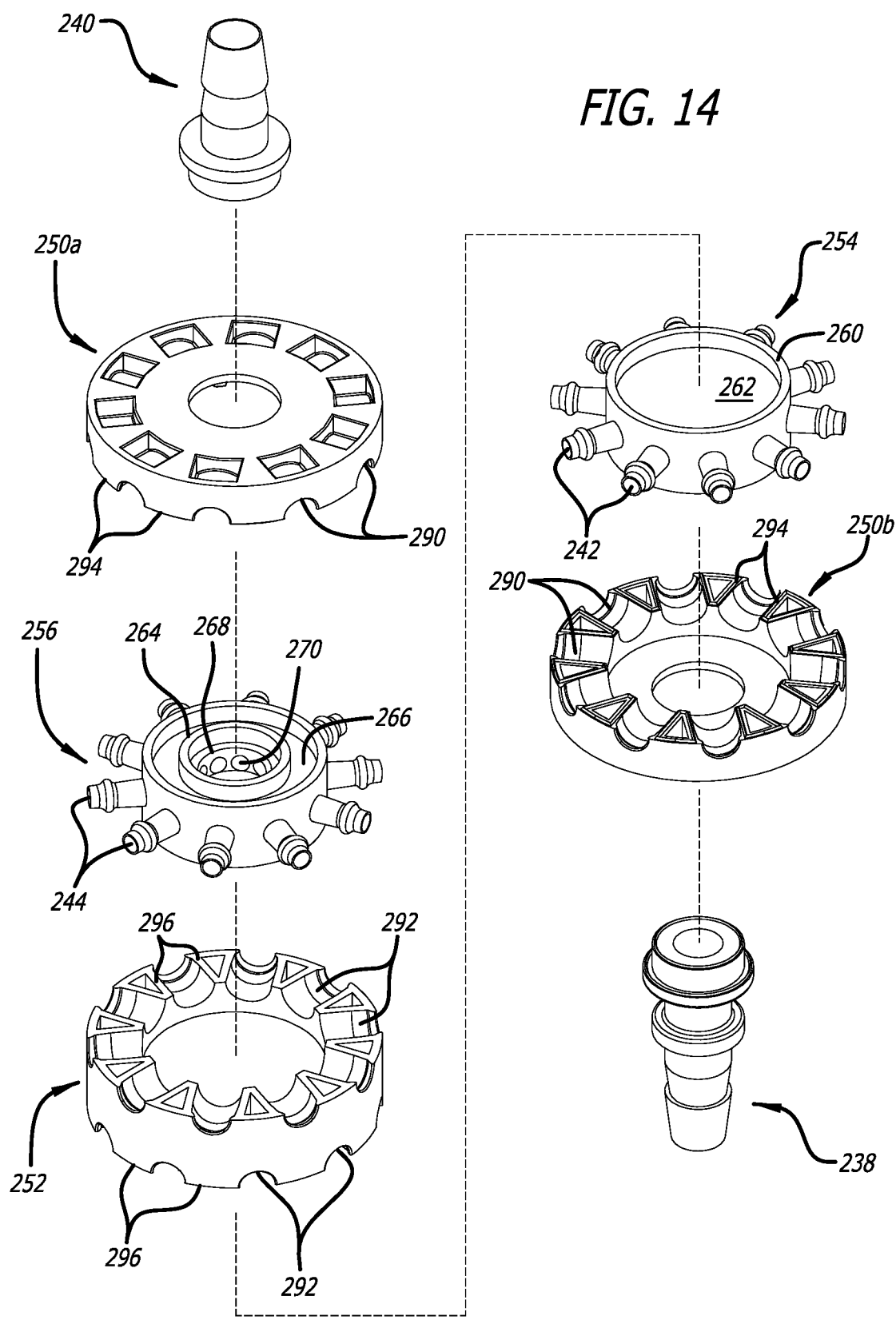
FIG. 14 is an exploded perspective view of the fluid distribution and vent manifold assembly along with inlet and outlet connectors.

With reference now to the exploded view of FIG. 14, the components of the fluid distribution and vent manifold assembly 228 can be better explained. The generally cylindrical frame 236 seen in FIG. 13 is formed by three disk-shaped members coupled together. Namely, upper and lower frame members 250a, 250b sandwich and are bonded to a central frame member 252 therebetween. The frame members 250a, 250b, 252 contain and conceal a pair of fluid distribution manifolds 254, 256. More particularly, as seen by the exploded elevational view of FIG. 15, a lower fluid distribution manifold 254 is positioned between the lower frame member 250b and the central frame member 252, and an upper vent distribution manifold 256 is positioned between the upper frame member 250a and the central frame member 252. The fluid distribution manifold 254 has the radially oriented outlet ports 242, and the vent distribution manifold 256 has the radially oriented inlet ports 244. The radially-projecting outlet and inlet ports 242, 244 are recessed within the frame members 250, 252 that axially sandwich the fluid distribution manifold 254 and vent distribution manifold 256 and define the outer compact cylindrical shape.

Figure 18A:
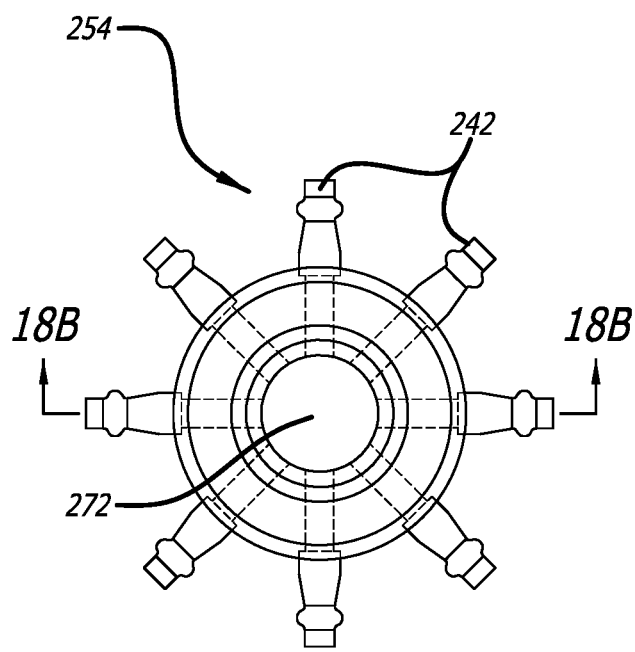
FIG. 18A is a bottom plan view of a fluid distribution manifold portion of the assembly of FIG. 15.
Figure 18B:
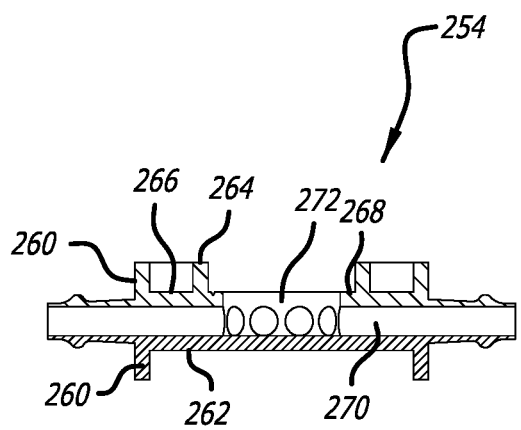
FIG. 18B is a radial sectional view through the fluid distribution manifold taken along the section line in FIG. 18A.

The fluid distribution manifold 254 and the vent distribution manifold 256 are preferably identical, and simply inverted vertically with respect to one another, and thus will be described together with like elements being given like reference numbers. As seen in FIG. 14, as well as with reference to FIGS. 18A and 18B, the fluid distribution manifold 254 has a cylindrical outer wall 260 from which the outlet ports 242 project radially outward. A solid radially-oriented plenum floor 262 extends across the manifold 254 within and is stepped axially downward from an upper edge of the cylindrical outer wall 260. The remaining features of the fluid distribution manifold 254 are also seen in the top view of the vent distribution manifold 256 in FIG. 14, as the two manifolds are identical.

The cylindrical outer wall 260 circumscribes a smaller inner circular wall 264 with a radially-oriented inner bulkhead 266 extending therebetween. The inner circular wall 264 extends axially until interrupted by a stepped cylindrical plenum chamber wall 268 through which a plurality of radial passages 270 open to a central plenum chamber 272. The radial passages 270 extend outward through the inlet ports 244 of the vent distribution manifold 256 (or the outlet ports 242 of the fluid distribution manifold 254).

FIGS. 16A and 16B are elevational views of the fluid distribution and vent manifold assembly 228 in slightly different rotational positions. As mentioned, the various components seen in FIG. 15 are combined into the compact cylindrical frame 236 with the inlet connector 238 projecting downward, and the outlet connector 240 projecting upward therefrom. The circular array of outlet ports 242 are seen below the circular array of inlet ports 244.

It should be noted that the 10 radial inlet ports 242 in the lower fluid distribution manifold 254 are angularly spaced apart from the 10 radial outlet ports 244 in the upper fluid distribution manifold 256. As seen in FIGS. 13 and 16A/16B, the radial inlet ports 242 are arrayed at 36° increments and angularly offset by half the amount, or 18°, with respect to the radial outlet ports 244. This helps provide space for the fluid and vent conduits 232, 234 that are connected around and radiate from the conjoined manifolds 254, 256, as seen in FIG. 12.

Figure 17A:
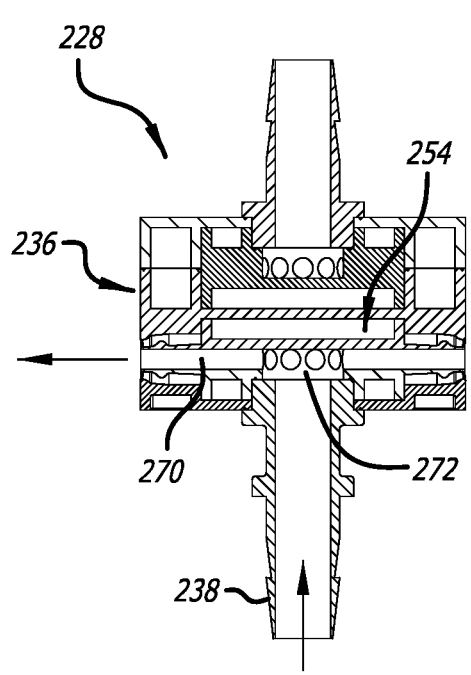
FIGS. 17A and 17B are axial sectional views through the fluid distribution and vent manifold assembly taken along the respective section lines in FIGS. 16A and 16B.
Figure 17B:
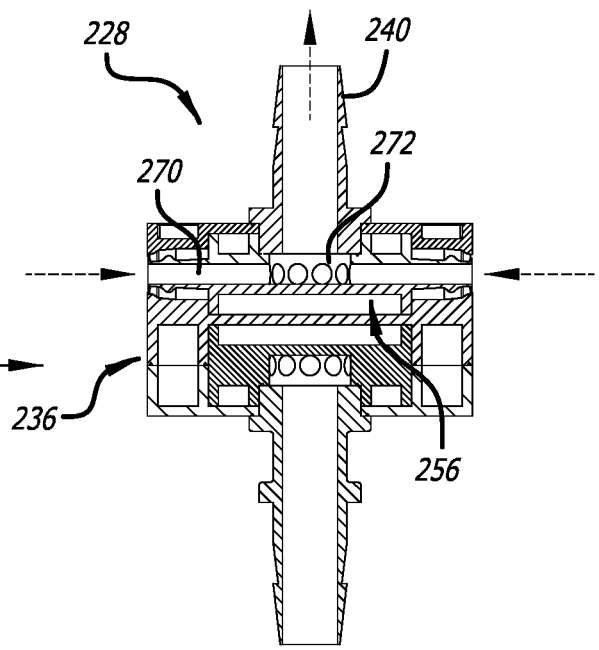

FIGS. 17A and 17B are axial sectional views through the fluid distribution and vent manifold assembly 228 taken along the respective section lines in FIGS. 16A and 16B. By virtue of the slightly different rotational orientation of FIGS. 16A and 16B, fluid and gasses flowing through the manifold assembly 228 can be seen. The inlet connector 238 and the outlet connector 240 both have stepped ends that engage the respective manifolds 254, 256 and open to respective central plenum chambers 272. Namely, the innermost end of each connector 238, 240 fits closely within the circular walls 264 and abuts the stepped cylindrical plenum chamber wall 268. Outward flanges on each connector 238, 240 contact outer faces of respective frame members 250a, 250b, best seen in FIGS. 13 and 16A/16B. Fluid or gasses thus flow directly to or from the plenum chambers 272 and through the connectors 238, 240.

First off, FIG. 16A is a section through one of the radial passages 270 in the fluid distribution manifold 254. Fluid introduced into the inlet connector 238 travels upward into the central plenum chamber 272 and is then evenly distributed outward through the radial passages 270, as indicated in FIG. 17A. FIGS. 11 and 12 show the subsequent connection of the outlet conduits 232 to the outlet ports 242, eventually leading to the fluid vessels or receptacles 222 held in the stand 224. Each receptacle 222 has a closure or cap 222a with an opening with which the outlet conduits 232 communicate. The cap 222a has a second opening with which the inlet conduits 234 communicate. The inlet conduits 234 extend upward and couple with the inlet ports 244 of the manifold assembly 228.

Accordingly, FIG. 16B is a section through one of the radial passages 270 in the vent distribution manifold 256. Gases which are displaced from the receptacles 222 upon filling with liquid are vented upward through the conduits 234, through the inlet ports 244 and into the radial passages 270 in the vent distribution manifold 256, as indicated in FIG. 17B. The gases flow inward to the central plenum chamber 272, and from there turn upward to exit through the outlet connector 240. Although not shown in FIG. 11, one or more common vent filter(s) may be attached to the outlet connector 240, such as shown at 60 in FIGS. 1 and 2.

The fluid distribution and vent manifold assembly 228 in the alternative system 220 exemplifies an advantageous assembly technique which greatly reduces assembly time and expense. Fluid distribution systems which are used to convey fluid in bulk from a single source to a plurality of separate vessels inevitably must utilize flexible tubing, such as the conduits 232, 234. Such conduits are typically coupled in the end-user processing facility to hose barbs on each end, with or without bonding or hose clamps and the like to prevent leakage. When assembling such a fluid distribution system, the time required to make each of these connections is significant, adding to assembly costs. Moreover, mistakes in the lab can occur when connecting numerous conduits to receptacles.

The fluid distribution and vent manifold assembly 228 is assembled in much less time than previous systems and with a greatly reduced margin for mistakes. In general, the assembly method involves pre-attaching the flexible tubing to manifold components in the manufacturing facility, and then joining the manifold components and flexible tubing together using the sandwiched frame members and bonding. Because the tubing can be more rapidly attached to the manifold components, as opposed to connecting the tubing between a manifold assembly and vessels after the fact, the entire process is speeded up.

Figure 19A:
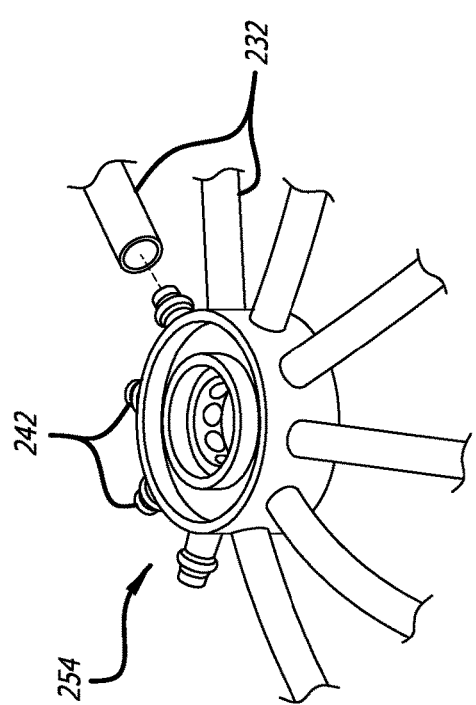
FIGS. 19A and 19B are perspective views of a fluid distribution manifold and vent distribution manifold, respectively, of the assembly of FIG. 14 during intermediate steps in the integration with flexible conduits.
Figure 19B:
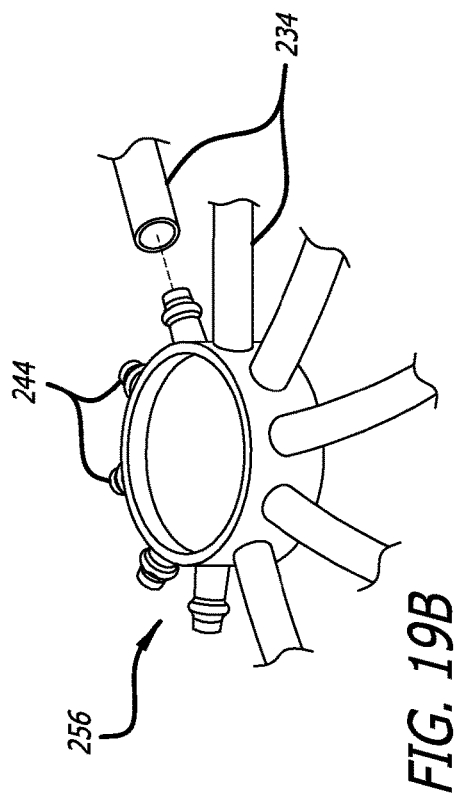

To illustrate the exemplary assembly method, reference is made to the perspective views of FIGS. 19A and 19B of the fluid distribution manifold 254 and vent distribution manifold 256. Initially, flexible outlet conduits 232 are attached to each of the outlet ports 242 of the fluid distribution manifold 254. Simultaneously, or sequentially, flexible inlet conduits 234 are attached to each of the inlet ports 244 emanating outward from the vent distribution manifold 256. In the illustrated embodiment, each of the ports 242, 244 are configured similar to hose barbs, though instead of a series of circular ribs only one may be necessary. Each of the circular ribs is sized slightly larger than the inner diameter of the associated flexible conduit, such that the conduits can be pushed onto the ports in an interference fit.

Figure 20:
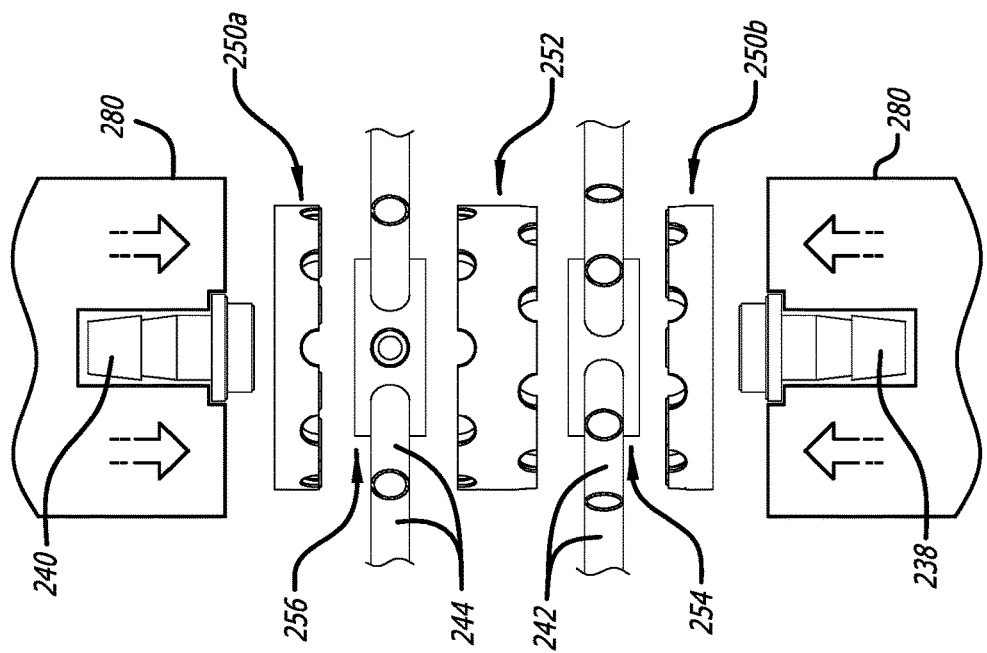
FIG. 20 is an exploded elevational view of the fluid distribution and vent manifold assembly integrated with flexible conduits in a process of pressing and bonding the components together.

Subsequently, the various components of the manifold assembly 228 are stacked as seen in FIG. 20. Opposing presses 280 are used to compress this stacked assembly of components together, applying pressure and vibration or heat/current to fuse the contacting components. The opposing presses 280 have pressing surfaces that mate closely with the stacked frame members 250*a*, 250*b*. A preferred method for bonding or fusing is sonic welding, though adhesives or thermal or electro-thermal welding may be used as an alternate or accompanying method.

Sonic welding, also known as ultrasonic welding, is a technique used to join thermoplastic materials together, and is widely used in various industries, including automotive, electronics, medical, and packaging. The process utilizes high-frequency mechanical vibrations to create frictional heat at the interface of the plastic parts, causing them to melt and fuse together.

Sonic welding involves first preparing plastic parts to be joined by ensuring that their surfaces are clean and free from contaminants. Any protective coatings, films, or adhesives are removed from the joining areas. The plastic parts are positioned between the opposing presses 280, which are designed to hold them securely during the welding process. The two presses 280 consist of a stationary anvil and a movable horn (also called an ultrasonic stack) that applies the ultrasonic vibrations to the parts. The opposing presses 280 applying a consistent pressure to ensure proper mating of the surfaces of the plastic parts into contact with each other (i.e., joints), in this case the stacked frame members 250*a*, 250*b*, as seen in FIGS. 13 and 16A/16B. The amount of pressure applied depends on the specific materials and their thickness.

The horn part of the opposing presses 280 transmits high-frequency ultrasonic vibrations (typically in the range of 20 kHz to 70 kHz) to the joint interface between the plastic parts. The vibrations are generated by a transducer, which converts electrical energy into mechanical vibrations. Consequently, the ultrasonic vibrations create rapid back-and-forth movements at the joint interfaces, causing frictional heat to build up between the plastic surfaces. This localized heat softens the plastic material, melting it at the contact points. As the plastic materials reach their melting points, the pressure applied to the joint forces the melted material to flow and interdiffuse, creating molecular bonds between the parts. Once the vibrations stop, the melted plastic resolidifies, forming a strong and durable bond.

After the ultrasonic vibrations cease, the joint is allowed to cool down. The cooling time depends on the specific plastic material and the size of the welded part. Cooling can be accelerated by methods such as air or water cooling. Once the joints have cooled and solidified, the welding process is considered complete. The welded parts can be inspected for any defects, such as incomplete fusion, voids, or flash. Additional trimming or post-weld processing may be required depending on the specific application.

The aforementioned technique for combining the components of the manifold assembly 228 could be utilized for other fluid distribution or collection systems. For instance, just the fluid distribution portion of the system without the vent distribution manifold may be assembled in this manner, as could just the vent manifold assembly without the fluid distributor. Likewise, other fluid transport subsystems could benefit from the assembly method, such as when pre-assembling flexible tubes to T- or Y-junctions, or the like, as described in U.S. Provisional Application No. 63/501,760, filed May 12, 2023, the contents of which are expressly incorporated herein.

It should be noted that the various components of the manifold assembly 228 are shaped to nest together so that when they are bonded together they form the compact cylindrical body 236 seen in FIG. 13. For instance, with reference to FIG. 14, the upper and lower frame members 250*a*, 250*b* have flat outer faces but define a plurality of radially-oriented concave channels or grooves 290 on their inner faces. These concave grooves 290 fit around each of the projecting ports 242, 246 in the manifolds 254, 256. Similarly, the central frame member 252 has a circular array of channels or grooves 292 on both its faces which also receive the projecting ports 242, 246. FIG. 13 shows the resulting assembly 228 in which the ports 242, 244 remain within the cylindrical outer boundary. This serves the purpose of protecting the integrity of the ports 242, 244 from damage, but more importantly clamps the inner ends of the flexible conduits 232, 234 around the ports. That is, the curvature of the radial grooves 290, 292 is matched to or slightly less than the outer diameter of the conduits 232, 234, which compresses the conduits around the circular ribs on each of the ports 242, 246. This ensures a good fluid-tight fit between the conduits and ports, much like a hose clamp or the like. Moreover, the compression provided by sandwiching the conduits between the grooves 290, 292 ensures that the conduits cannot be pulled loose from the respective port.

Each of the frame members 250*a*, 250*b*, 252 has a number of planar joint surfaces 294, 296 that match up with the joint surface of the other cover. The planar joint surfaces 294, 296 extend along the edges of the concave channels or grooves 290, 292 in planes perpendicular to a central axis of the assembly components, and are generally arranged in radial patterns. Juxtaposition of these joint surfaces 294, 296 between the adjacent frame members 250*a*, 250*b*, 252 enables them to be bonded together. More particularly, the joint surfaces 294 of the upper frame member 250a contact upper joint surfaces 296 of the central frame member 252, and the joint surfaces 294 of the lower frame member 250b contact lower joint surfaces 296 of the central frame member 252. The bonding can be done in a number of ways, including adhesives, fusion or electro-fusion welding, and sonic welding. The present application contemplates an assembly process that utilizes sonic welding to avoid the use of chemical adhesives.

Figure 21:
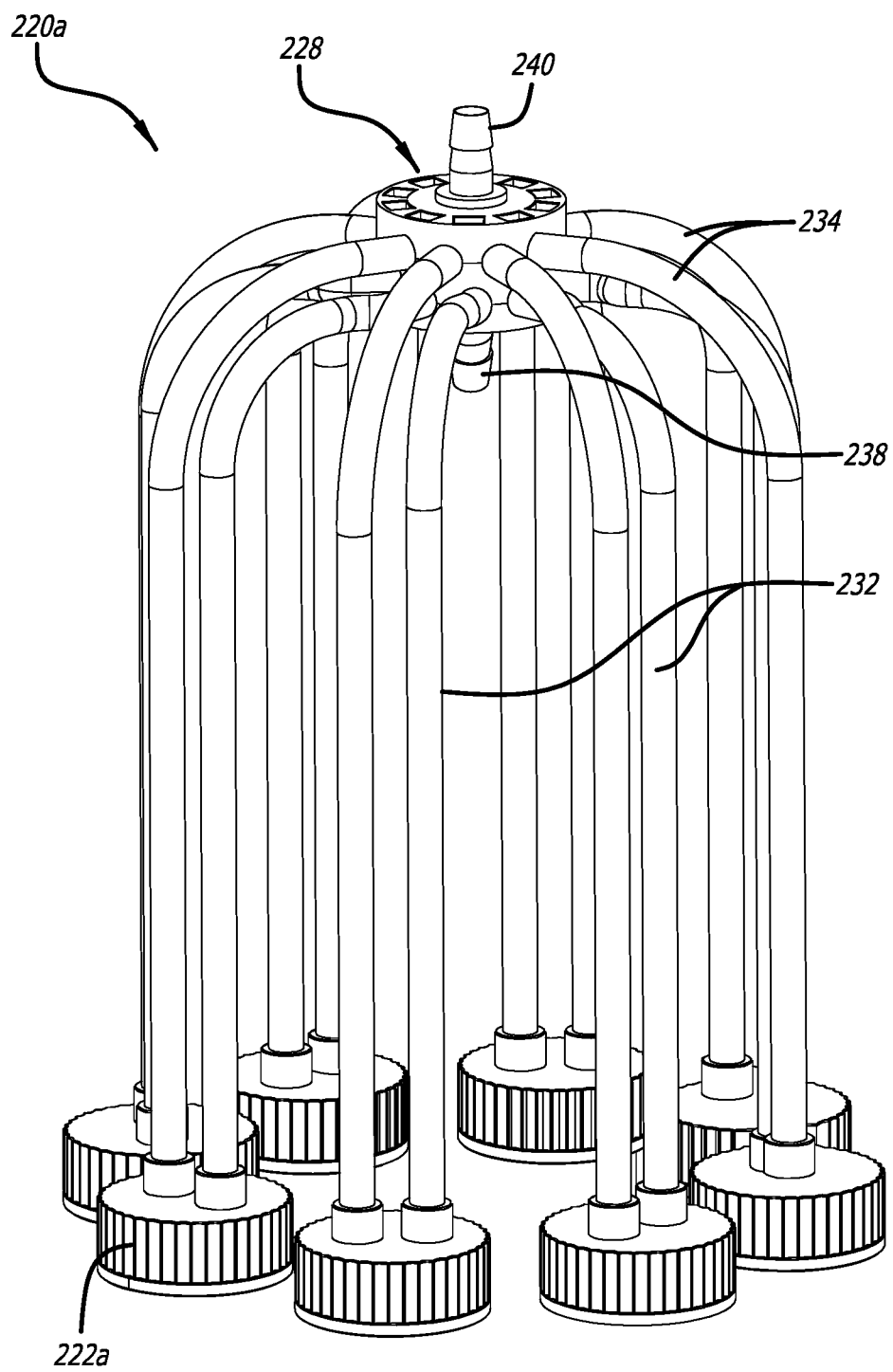
FIG. 21 is a perspective view of a deliverable/consumable sterile fluid distribution subsystem for attaching to receptacles enabling filled with fluid from a single source.

FIG. 21 is a perspective view of a deliverable/consumable sterile fluid distribution subsystem 220a for attaching to receptacles, enabling filling with fluid from a single source. The subsystem 220a forms a part of the larger fluid distribution system 220 seen in FIG. 11. The subsystem 220a can be rapidly and efficiently assembled in the manufacturing facility, as explained above, and packaged in a sterile form for instant integration into the larger system 220 in the lab.

The fluid distribution subsystem 220a comprises the manifold assembly 228 having the inlet connector 238 and outlet connector 240, as described above. Fluid outlet conduits 232 and a fluid inlet conduits 234 are pre-assembled with the manifold assembly 228, as described above. Finally, the conduits 232, 234 are coupled to the receptacle caps 222a. By producing and shipping the subsystem 220a in this form in a sterile packaging, the end-user need only connect the remaining elements of the overall system 220 such as screwing sterile receptacles 222 onto the caps 222a and attaching a fluid source to the inlet connector 238, and a common vent to the outlet connector 240. These final assembly steps take a matter of minutes, and are nearly fool-proof in terms of making the right connections, after which the end-user can begin filling the receptacles with fluid. Once processing within the receptacles 222 is complete, the conduits 232, 234 to each may be closed off, such as with the clamps or flow control valves 110, 112 seen in FIG. 5, and then severed to disconnect the closed receptacles 222 from the larger fill system. The subsystem 220a is relatively inexpensive to manufacture, and thus is a consumable product which can be disposed of after use.

Terms such as top, bottom, left and right are used herein, though the fluid manifolds may be used in various positions such as upside down. Thus, some descriptive terms are used in relative terms and not absolute terms.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It is claimed:

1. A system for distributing fluid from a single fluid source into multiple receptacles, comprising:

a manifold assembly including a fluid distribution manifold comprising a solid molded body having a central fluid inlet in communication with the single fluid source leading to an inner fluid plenum chamber, the fluid distribution manifold having a plurality of fluid outlets fluidly connected to and radiating outward from the fluid plenum chamber, the manifold assembly further including a vent distribution manifold having a solid molded body separate from but disposed adjacent and secured with respect to the fluid distribution manifold, the vent distribution manifold comprising a central vent outlet in fluid communication with an inner vent plenum chamber, the vent distribution manifold further having a plurality of vent inlets fluidly connected to and radiating outward from the vent plenum chamber;

a plurality of outlet conduits each connected in fluid communication with a fluid outlet of the fluid distribution manifold and connected to an opening in a receptacle cap configured to be fastened to an open mouth of a receptacle, wherein fluid provided to the central fluid inlet of the fluid distribution manifold, and said fluid is configured to be distributed from the fluid plenum chamber through the fluid outlets and outlet conduits into the receptacles; and a plurality of vent conduits each connected in fluid communication with a vent inlet of the vent distribution manifold and connected to a receptacle gas vent formed by an opening in the receptacle cap, wherein gasses vented from the receptacles are configured to pass through the vent conduits and through the vent inlets into the vent plenum chamber, and from there through the central vent outlet.

2. The system of claim 1, further including a common vent filter connected to the vent outlet and configured to filter any gas which reaches the vent outlet.

3. The system of claim 1, wherein the solid body of the fluid distribution manifold has a cylindrical periphery centered on a central axis, and the fluid outlets open radially outward around the cylindrical periphery, and the solid body of the vent distribution manifold has a cylindrical periphery centered on the central axis and co-axial with the fluid distribution manifold, and the vent inlets open radially outward around the cylindrical periphery.

4. The system of claim 3, wherein the outlet conduits and vent conduits are bonded to the respective fluid outlets and vent inlets.

5. The system of claim 1, wherein the manifold assembly has a cylindrical exterior and wherein the fluid outlets are evenly distributed around the central axis and the vent inlets are evenly distributed around the central axis but offset angularly from the fluid outlets.

6. The system of claim 1, wherein the solid body of the fluid distribution manifold has a plurality of outwardly-projecting outlet ports to which the outlet conduits attach, and the solid body of the vent distribution manifold has a plurality of outwardly-projecting inlet ports to which the inlet conduits attach, and the outlet and inlet ports are recessed within frame members that axially sandwich and secure the fluid distribution manifold and vent distribution manifold together.

7. The system of claim 5, wherein the frame members each have cylindrical exterior shapes such that the manifold assembly defines a cylindrical exterior.

8. The system of claim 5, wherein there are three frame members, an upper member, a lower member, and a central frame member, wherein the vent distribution manifold is axially sandwiched between the upper and central frame members, and the fluid distribution manifold is axially sandwiched between the lower and central frame members.

9. The system of claim 7, wherein the frame members each have radial grooves sized to compress the outlet conduits and vent conduits around respective outlet and inlet ports.

10. The system of claim 9, wherein the frame members all have planar joint surfaces that contact and bond to planar joint surfaces of adjacent frame members.

11. A system for distributing fluid from a single fluid source into multiple receptacles, comprising:
 a solid cylindrical manifold assembly including a solid molded fluid distribution manifold having a fluid inlet centered on a central axis in communication with the single fluid source leading to an inner fluid plenum chamber, the solid cylindrical manifold assembly having a plurality of fluid outlets fluidly connected to and radiating from the central axis outward from the fluid plenum chamber, the manifold assembly further including a solid molded vent distribution manifold separate from but disposed adjacent and secured co-axially with respect to the fluid distribution manifold, the vent distribution manifold comprising a central vent outlet in fluid communication with an inner vent plenum chamber, the vent distribution manifold further having a plurality of vent inlets fluidly connected to and radiating from the central axis outward from the vent plenum chamber;
 a plurality of outlet conduits, each of the plurality of outlet conduits connected in fluid communication with one of the plurality of fluid outlets of the fluid distribution manifold, wherein fluid provided to the central fluid inlet of the fluid distribution manifold is configured to be distributed from the fluid plenum chamber through the plurality of fluid outlets and the plurality of outlet conduits; and
 a plurality of vent conduits each connected in fluid communication with a vent inlet of the vent distribution manifold, wherein gasses are configured to pass through the plurality of vent conduits and through the vent inlet into the vent plenum chamber, and from there through the central vent outlet.

12. The system of claim 11, wherein the fluid distribution manifold has a cylindrical exterior and is stacked and bonded directly to the vent distribution manifold which also has a cylindrical exterior.

13. The system of claim 11 wherein the outlet conduits and vent conduits are bonded to the respective fluid outlets and vent inlets.

14. The system of claim 11, further including a common vent filter connected to the vent outlet and configured to filter any gas which reaches the vent outlet.

15. The system of claim 11, wherein the fluid outlets are evenly distributed around the central axis and the vent inlets are evenly distributed around the central axis but offset angularly from the fluid outlets.

16. The system of claim 11, wherein the solid body of the fluid distribution manifold has a plurality of outwardly-projecting outlet ports to which the outlet conduits attach, and the solid body of the vent distribution manifold has a plurality of outwardly-projecting inlet ports to which the inlet conduits attach, and the outlet and inlet ports are recessed within frame members that axially sandwich and secure the fluid distribution manifold and vent distribution manifold together.

17. The system of claim 16, wherein there are three frame members, an upper member, a lower member, and a central frame member, wherein the vent distribution manifold is axially sandwiched between the upper and central frame members, and the fluid distribution manifold is axially sandwiched between the lower and central frame members.

18. The system of claim 16, wherein the frame members each have radial grooves sized to compress the outlet conduits and vent conduits around respective outlet and inlet ports.

19. The system of claim 16, wherein the frame members each have cylindrical exterior shapes.

20. The system of claim 16, wherein the frame members all have planar joint surfaces that contact and bond to planar joint surfaces of adjacent frame members.

\* \* \* \* \*